United States Patent
Kim et al.

(10) Patent No.: US 9,621,316 B2
(45) Date of Patent: Apr. 11, 2017

(54) METHOD AND DEVICE FOR RECEIVING DOWNLINK SIGNAL IN WIRELESS COMMUNICATION SYSTEM

(71) Applicant: LG ELECTRONICS INC., Seoul (KR)

(72) Inventors: Eunsun Kim, Anyang-si (KR); Byounghoon Kim, Anyang-si (KR); Kijun Kim, Anyang-si (KR); Hanbyul Seo, Anyang-si (KR); Jonghyun Park, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/411,773

(22) PCT Filed: Jul. 3, 2013

(86) PCT No.: PCT/KR2013/005894
§ 371 (c)(1),
(2) Date: Dec. 29, 2014

(87) PCT Pub. No.: WO2014/007538
PCT Pub. Date: Jan. 9, 2014

(65) Prior Publication Data
US 2015/0195068 A1 Jul. 9, 2015

Related U.S. Application Data

(60) Provisional application No. 61/667,937, filed on Jul. 3, 2012, provisional application No. 61/669,134, filed (Continued)

(51) Int. Cl.
*H04L 5/00* (2006.01)
*H04J 11/00* (2006.01)

(52) U.S. Cl.
CPC ........ *H04L 5/0048* (2013.01); *H04J 11/0053* (2013.01); *H04L 5/0023* (2013.01); *H04L 5/0035* (2013.01); *H04L 5/0094* (2013.01)

(58) Field of Classification Search
None
See application file for complete search history.

(56) References Cited

U.S. PATENT DOCUMENTS 8,934,326 B2 * 1/2015 Bhattad .................. H04J 11/005
    370/201
2011/0267937 A1 * 11/2011 Yoo ........................ H04J 11/005
    370/201

(Continued)

FOREIGN PATENT DOCUMENTS

KR  10-2010-0117522 A  11/2010
KR  10-2011-0011508 A   2/2011

(Continued)

OTHER PUBLICATIONS

Ericsson et al., "Discussion on quasi co-located antennas," 3GPP TSG-RAN WG4 #63, May 21-25, 2012, pp. 1-7, R4-122702.

(Continued)

*Primary Examiner* — Kodzovi Acolatse
(74) *Attorney, Agent, or Firm* — Birch, Stewart, Kolasch & Birch, LLP

(57) ABSTRACT

A method for a terminal for receiving a downlink signal according to an embodiment of the present invention comprises the steps of: receiving, from a serving cell, a cell-specific reference signal (CRS) information for a neighboring cell; and receiving, from a serving cell and/or a neighboring cell, a physical downlink shared channel (PDSCH), wherein the CRS of the serving cell is invalidated if the terminal receives a PDSCH from the neighboring cell.

18 Claims, 22 Drawing Sheets

Marco-pico
(With pathloss-based cell selection)

Related U.S. Application Data on Jul. 9, 2012, provisional application No. 61/679,057, filed on Aug. 2, 2012, provisional application No. 61/681,646, filed on Aug. 10, 2012, provisional application No. 61/735,518, filed on Dec. 10, 2012, provisional application No. 61/754,627, filed on Jan. 20, 2013.

(56) References Cited

U.S. PATENT DOCUMENTS

| | | |
|---|---|---|
| 2012/0046033 A1 | 2/2012 | Ko et al. |
| 2012/0087261 A1 | 4/2012 | Yoo et al. |
| 2012/0155362 A1* | 6/2012 | Montojo ............. H04W 72/082 370/312 |
| 2012/0182951 A1 | 7/2012 | Okubo et al. |
| 2013/0114496 A1* | 5/2013 | Mazzarese ............ H04L 5/0023 370/312 |
| 2013/0182799 A1 | 7/2013 | Geirhofer et al. |
| 2013/0258964 A1 | 10/2013 | Nam et al. |
| 2013/0279437 A1 | 10/2013 | Ng et al. |
| 2014/0092827 A1 | 4/2014 | Jöngren et al. |
| 2014/0119266 A1 | 5/2014 | Ng et al. |
| 2014/0128115 A1* | 5/2014 | Siomina ................ H04L 1/0015 455/501 |
| 2014/0286184 A1 | 9/2014 | Kim et al. |
| 2015/0105077 A1* | 4/2015 | Yao .................... H04W 36/0061 455/436 |

FOREIGN PATENT DOCUMENTS

| | | |
|---|---|---|
| WO | WO 2011/005537 A2 | 1/2011 |
| WO | WO 2011/021587 A1 | 2/2011 |
| WO | WO 2011/137314 A1 | 11/2011 |
| WO | WO 2011/163201 A1 | 12/2011 |

OTHER PUBLICATIONS

Ericsson, "Draft LS response on reference scenarios for antenna ports co-location," 3GPP TSG-RAN1 Meeting #69, May 21-25, 2012, 2 pages, R1-122540.

Ericsson, "LS response on antenna ports co-location," 3GPP TSG-RAN1 Meeting #68bis, Mar. 26-30, 2012, 2 pages, R1-121919.

* cited by examiner

Sub-frame

FIG. 7
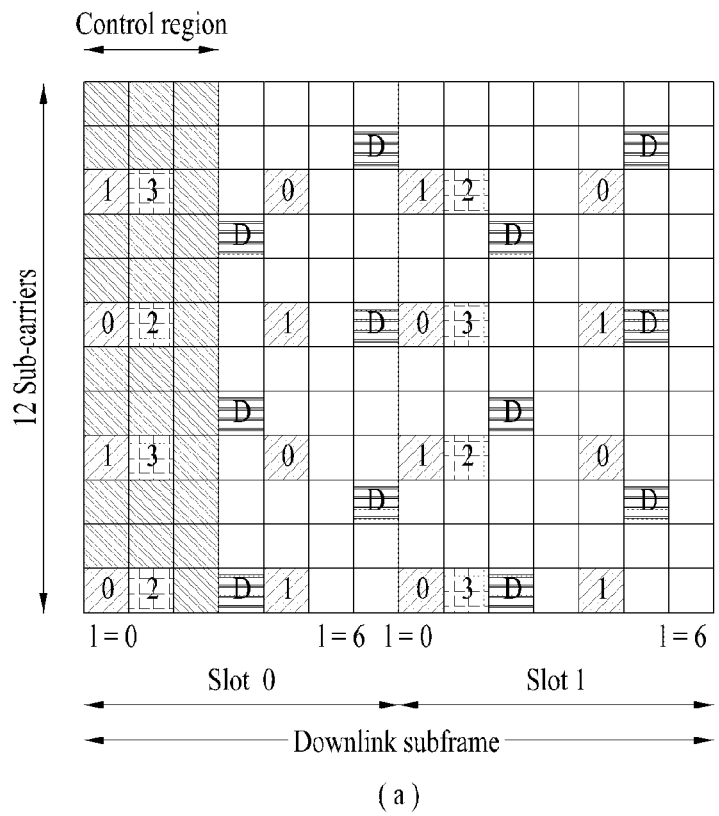
(a)
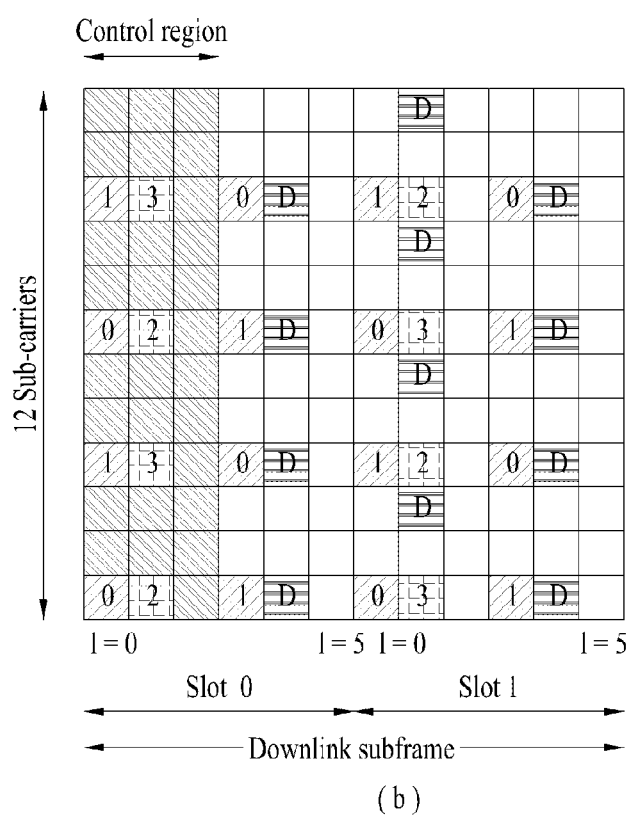
(b)

METHOD AND DEVICE FOR RECEIVING DOWNLINK SIGNAL IN WIRELESS COMMUNICATION SYSTEM

CROSS REFERENCE TO RELATED APPLICATIONS

This application is the National Phase of PCT/KR2013/005894 filed on Jul. 3, 2013, which claims priority under 35 U.S.C. 119(e) to U.S. Provisional Application No. 61/667,937 filed on Jul. 3, 2012; 61/669,134 filed on Jul. 9, 2012; 61/679,057 filed on Aug. 2, 2012; 61/681,646 filed on Aug. 10, 2012; 61/735,518 filed on Dec. 10, 2012, and 61/754,627 filed on Jan. 20, 2013, all of which are hereby expressly incorporated by reference into the present application.

TECHNICAL FIELD

The present invention relates to a wireless communication system, and more particularly to a method and apparatus for receiving a downlink signal through interference handling.

BACKGROUND ART

Wireless communication systems have been widely used to provide various kinds of communication services such as voice or data services. Generally, a wireless communication system is a multiple access system that can communicate with multiple users by sharing available system resources (bandwidth, transmission (Tx) power, and the like). A variety of multiple access systems can be used. For example, a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency-Division Multiple Access (SC-FDMA) system, a Multi-Carrier Frequency Division Multiple Access (MC-FDMA) system, and the like.

DISCLOSURE

Technical Problem

An object of the present invention is to provide methods for receiving a downlink signal while simultaneously performing interference handling under a coordinated multi-point (CoMP) environment.

It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for receiving a downlink signal by a user equipment (UE) in a wireless communication system including: receiving neighbor cell—Cell specific Reference Signal (CRS) information from a serving cell; and receiving a physical downlink shared channel (PDSCH) from any one of a serving cell and a neighbor cell. If the UE receives the PDSCH from the neighbor cell, CRS interference cancellation to CRS of the serving cell is performed.

In accordance with another aspect of the present invention, a user equipment (UE) device for use in a wireless communication system includes: a reception (Rx) module; and a processor, wherein the processor receives neighbor cell—Cell specific Reference Signal (CRS) information from a serving cell, and receives a physical downlink shared channel (PDSCH) from any one of a serving cell and a neighbor cell. If the UE receives the PDSCH from the neighbor cell, CRS interference cancellation to CRS of the serving cell is performed.

The first and second technical aspects may include the following items.

The UE may receive not only indication information for indicating that a CRS position of the neighbor is rate-matched, but also rate matching pattern information.

The UE may omit execution of CRS cancellation associated with the CRS of the neighbor cell, not only using the indication information for indicating that the CRS position of the neighbor cell is rate-matched, but also using the rate matching pattern information.

If the UE receives the PDSCH from the serving cell, CRS interference cancellation to CRS of the serving cell may be not performed.

If the serving cell is a pico base station (BS) and the neighbor cell is a macro BS, the neighbor cell CRS information may be CRS information of at least one neighbor cell that causes an interference source to the serving cell.

If the serving cell is a macro base station (BS) and the neighbor cell is a pico BS, the neighbor cell CRS information may be CRS information of at least one neighbor cell that causes an interference source when the neighbor cell transmits a signal to the UE.

The neighbor cell CRS information may include a plurality of cell identifiers (IDs), each of which is mapped to information regarding the number of antenna ports, information regarding a frequency region to which CRS is transmitted, and information regarding a time region to which CRS is transmitted.

The UE may cancel CRS of cells corresponding to the plurality of cell IDs.

The UE may cancel CRS of cells corresponding to cell IDs other than a cell ID having confirmed a rate matching, from among the plurality of cell IDs.

The rate-matching confirmation may be based on information corresponding to a predetermined field value of a downlink control information (DCI) format.

The rate-matching confirmation may be based on information corresponding to a predetermined field value of a downlink control information (DCI) format.

The serving cell and the neighbor cell may be configured to perform cooperative transmission for the UE.

Advantageous Effects

As is apparent from the above description, the embodiments of the present invention can receive a downlink signal by efficiently performing interference handling under various coordinated multi-point (CoMP) environments.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

FIG. 7 is a conceptual diagram illustrating a reference signal (RS).

BEST MODE

Figure 1:
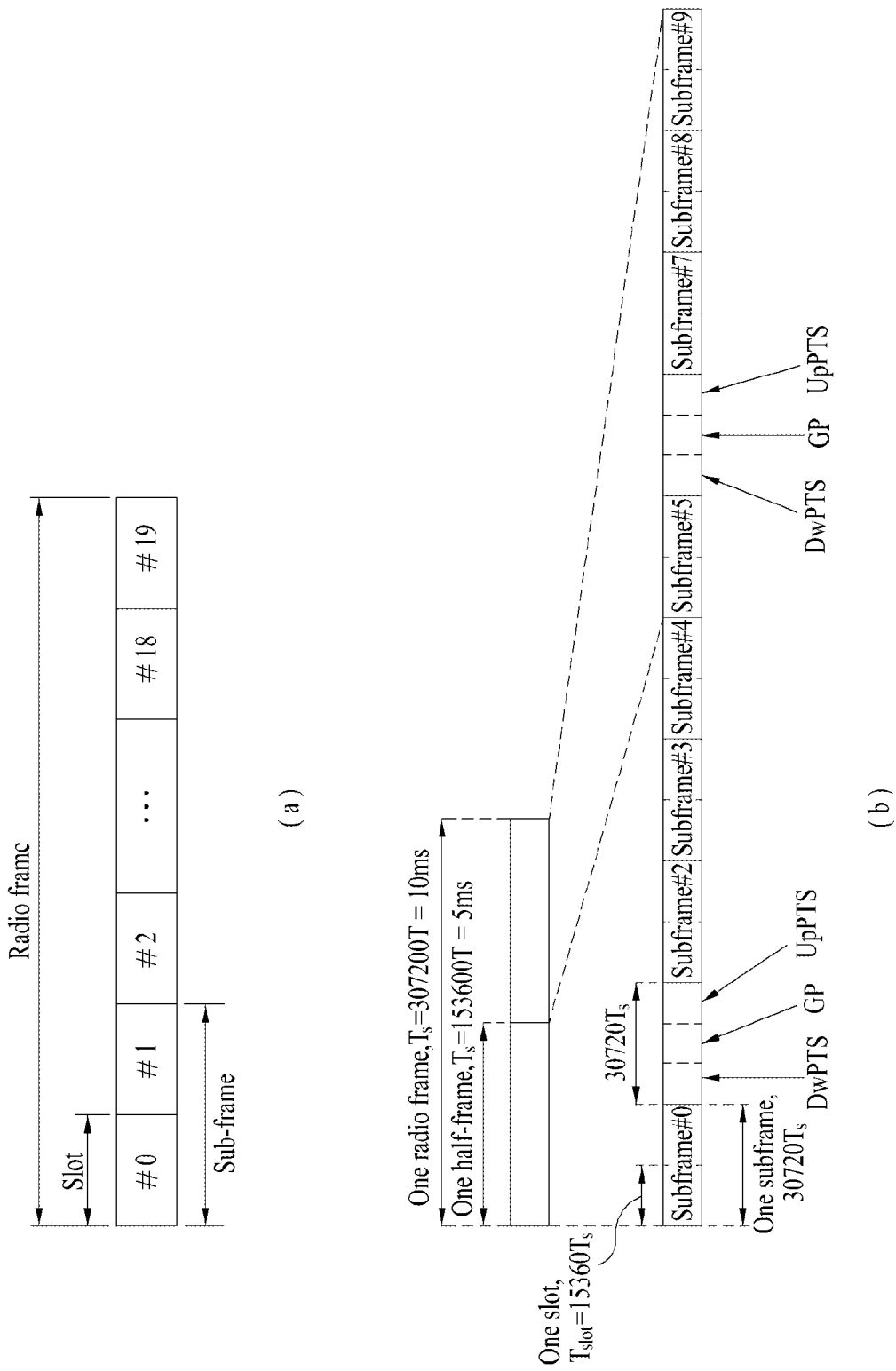
FIG. 1 exemplarily shows a radio frame structure.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. Also, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

The embodiments of the present invention are disclosed on the basis of a data communication relationship between a base station and a terminal. In this case, the base station is used as a terminal node of a network via which the base station can directly communicate with the terminal. Specific operations to be conducted by the base station in the present invention may also be conducted by an upper node of the base station as necessary.

In other words, it will be obvious to those skilled in the art that various operations for enabling the base station to communicate with the terminal in a network composed of several network nodes including the base station will be conducted by the base station or other network nodes other than the base station. The term "Base Station (BS)" may be replaced with a fixed station, Node-B, eNode-B (eNB), or an access point as necessary. The term "relay" may be replaced with the terms Relay Node (RN) or Relay Station (RS). The term "terminal" may also be replaced with a User Equipment (UE), a Mobile Station (MS), a Mobile Subscriber Station (MSS) or a Subscriber Station (SS) as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of UMTS (Universal Mobile Telecommunications System). 3GPP (3rd Generation Partnership Project) LTE (long term evolution) is a part of E-UMTS (Evolved UMTS), which uses E-UTRA. 3GPP LTE employs OFDMA in downlink and employs SC-FDMA in uplink. LTE-Advanced (LTE-A) is an evolved version of 3GPP LTE. WiMAX can be explained by IEEE 802.16e (WirelessMAN-OFDMA Reference System) and advanced IEEE 802.16m (WirelessMAN-OFDMA Advanced System). For clarity, the following description focuses on IEEE 802.11 systems. However, technical features of the present invention are not limited thereto.

LTE/LTE-A Resource Structure/Channel

FIG. 1 exemplarily shows a radio frame structure.

The structure of a radio frame in 3GPP LTE system will be described with reference to FIG. 1. In a cellular Orthogonal Frequency Division Multiplexing (OFDM) radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram showing the structure of the type 1 radio frame. A radio frame includes 10 subframes, and one subframe includes two slots in the time domain. A time required for transmission of one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since the 3GPP LTE system uses OFDMA in downlink, the OFDM symbol indicates one symbol duration. The OFDM symbol may be called an SC-FDMA symbol or a symbol duration. An RB is a resource allocation unit and includes a plurality of contiguous subcarriers in one slot.

The number of OFDM symbols included in one slot may be changed according to the configuration of a Cyclic Prefix (CP). The CP includes an extended CP and a normal CP. For example, if the OFDM symbols are configured by the normal CP, the number of OFDM symbols included in one slot may be seven. If the OFDM symbols are configured by the extended CP, the length of one OFDM symbol is increased, and the number of OFDM symbols included in one slot is less than that of the case of the normal CP. In case of the extended CP, for example, the number of OFDM symbols included in one slot may be six. If a channel state is unstable, for example, if a User Equipment (UE) moves at a high speed, the extended CP may be used in order to further reduce interference between symbols.

In case of using the normal CP, since one slot includes seven OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PDSCH).

The structure of a type 2 radio frame is shown in FIG. 1(b). The type 2 radio frame includes two half-frames, each of which is made up of five subframes, a downlink pilot time slot (DwPTS), a guard period (GP), and an uplink pilot time slot (UpPTS), in which one subframe consists of two slots. That is, one subframe is composed of two slots irrespective of the radio frame type. DwPTS is used to perform initial cell search, synchronization, or channel estimation. UpPTS is used to perform channel estimation of a base station and uplink transmission synchronization of a user equipment (UE). The guard interval (GP) is located between uplink and downlink so as to remove interference generated in the uplink due to multi-path delay of a downlink signal. That is, one subframe is composed of two slots irrespective of the radio frame type.

The structure of the radio frame is only exemplary. Accordingly, the number of subframes included in the radio frame, the number of slots included in the subframe or the number of symbols included in the slot may be changed in various manners.

Figure 2:
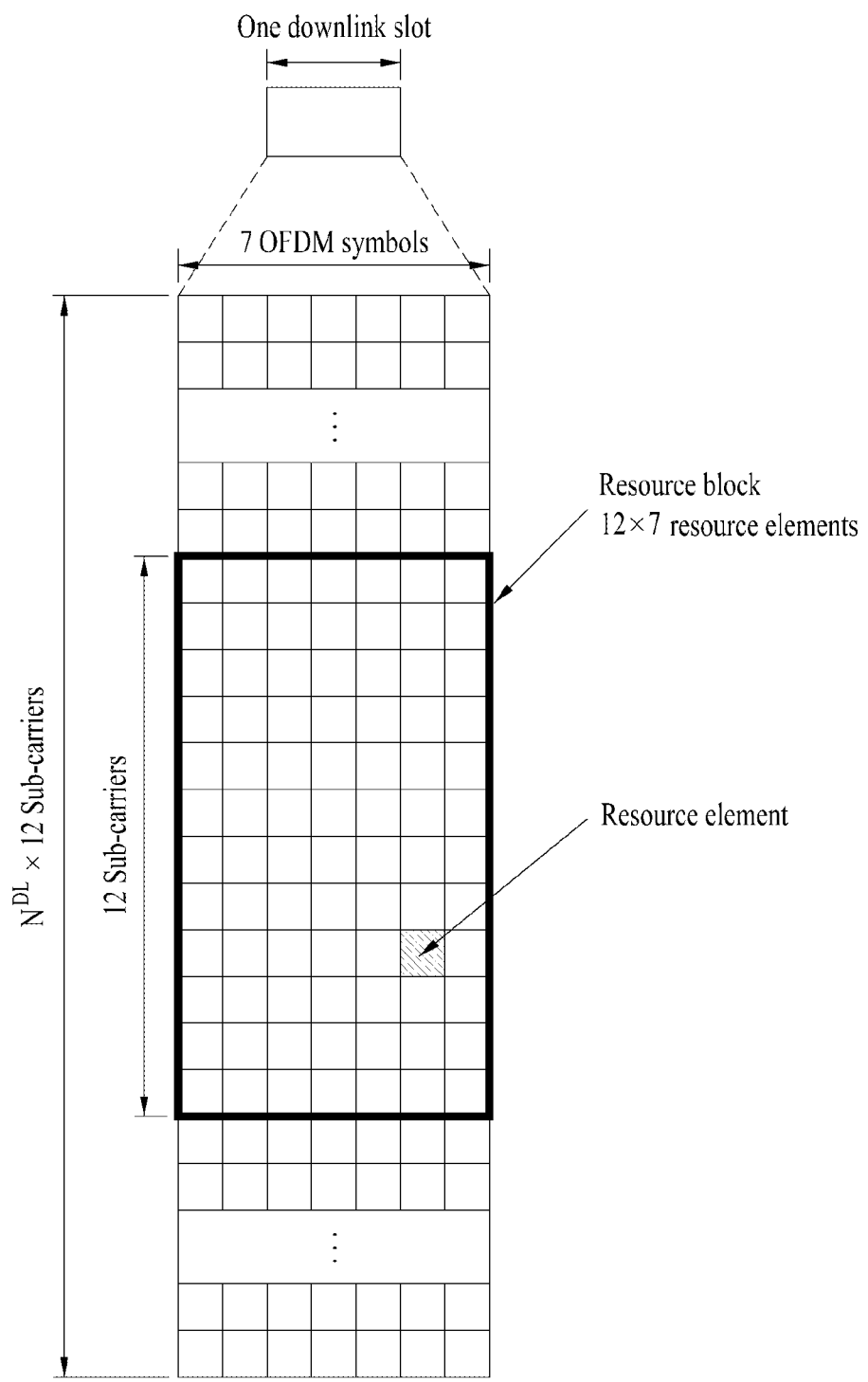
FIG. 2 exemplarily shows a resource grid of a downlink slot.

FIG. 2 is a diagram showing a resource grid in a downlink slot. Although one downlink slot includes seven OFDM symbols in a time domain and one RB includes 12 subcarriers in a frequency domain in the figure, the scope or spirit of the present invention is not limited thereto. For example, in case of a normal Cyclic Prefix (CP), one slot includes 7 OFDM symbols. However, in case of an extended CP, one slot may include 6 OFDM symbols. Each element on the resource grid is referred to as a resource element. One RB includes 12×7 resource elements. The number $N^{DL}$ of RBs included in the downlink slot is determined based on downlink transmission bandwidth. The structure of the uplink slot may be equal to the structure of the downlink slot.

Figure 3:
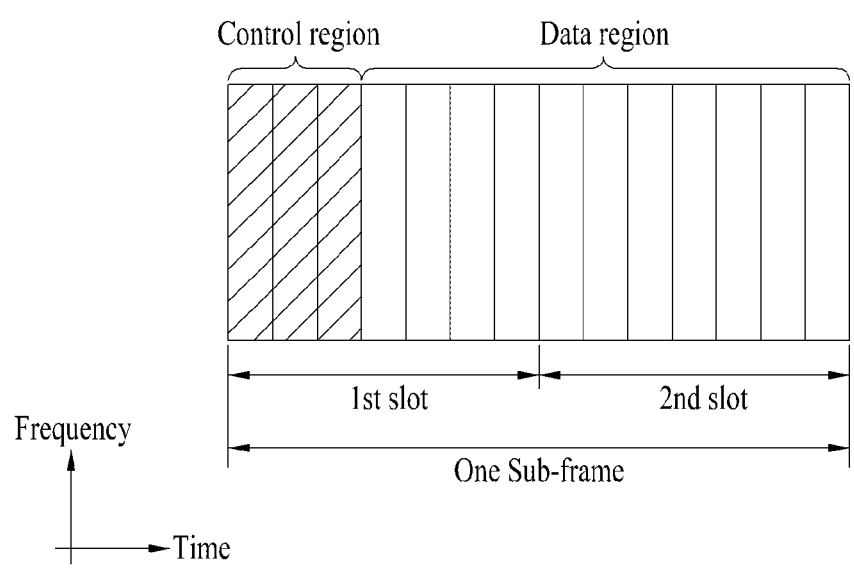
FIG. 3 exemplarily shows a downlink subframe structure.

FIG. 3 is a diagram showing the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. The basic unit of transmission becomes one subframe. Examples of the downlink control channels used in the 3GPP LTE system include, for example, a Physical Control Format Indicator Channel (PCFICH), a Physical Downlink Control Channel (PDCCH), a Physical Hybrid automatic repeat request Indicator Channel (PHICH), etc. The PCFICH is transmitted at a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a Random Access Response (RAR) transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted as an aggregate of one or several contiguous control channel elements (CCEs). The CCE is a logical allocation unit used to provide the PDCCHs at a coding rate based on the state of a radio channel. The CCE corresponds to a plurality of resource element groups. The format of the PDCCH and the number of available bits are determined based on a correlation between the number of CCEs and the coding rate provided by the CCEs. The eNB (or base station) determines a PDCCH format according to a DCI to be transmitted to the UE, and attaches a Cyclic Redundancy Check (CRC) to control information. The CRC is masked with a Radio Network Temporary Identifier (RNTI) according to an owner or usage of the PDCCH. If the PDCCH is for a specific UE, a cell-RNTI (C-RNTI) of the UE may be masked to the CRC. Alternatively, if the PDCCH is for a paging message, a paging indicator identifier P-RNTI) may be masked to the CRC. If the PDCCH is for system information (more specifically, a system information block (SIB)), a system information identifier and a system information RNTI (SI-RNTI) may be masked to the CRC. To indicate a random access response that is a response for transmission of a random access preamble of the UE, a random access-RNTI (RA-RNTI) may be masked to the CRC.

Figure 4:
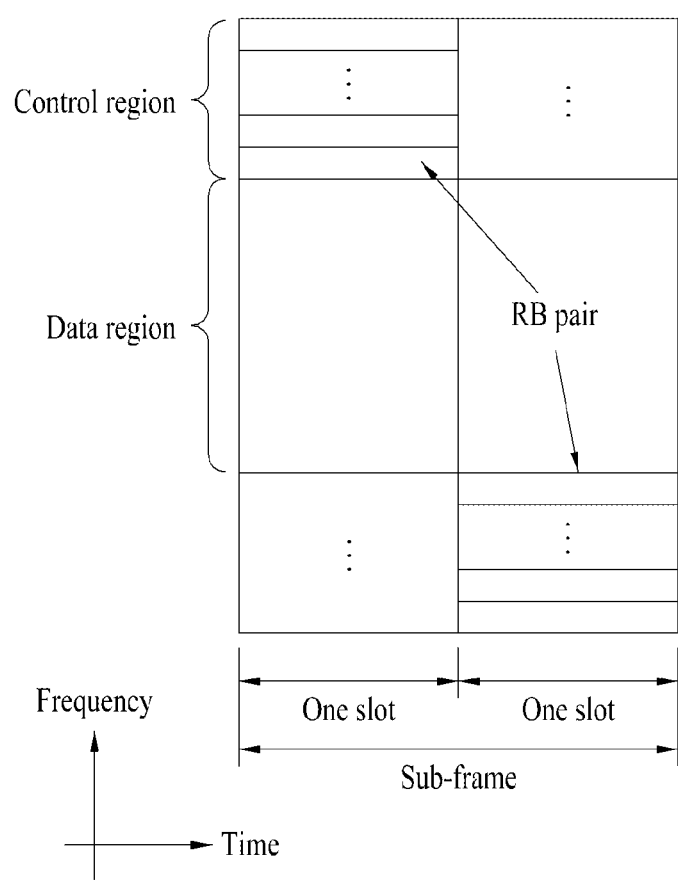
FIG. 4 exemplarily shows an uplink subframe structure.

FIG. 4 is a diagram showing the structure of an uplink frame. The uplink subframe may be divided into a control region and a data region in a frequency domain. A Physical Uplink Control Channel (PUCCH) including uplink control information is allocated to the control region. A Physical Uplink Shared Channel (PUSCH) including user data is allocated to the data region. In order to maintain single carrier characteristics, one UE does not simultaneously transmit the PUCCH and the PUSCH. The PUCCH for one UE is allocated to an RB pair in a subframe. RBs belonging to the RB pair occupy different subcarriers with respect to two slots. Thus, the RB pair allocated to the PUCCH is "frequency-hopped" at a slot edge.

PDSCH Transmission Process

Figure 5:
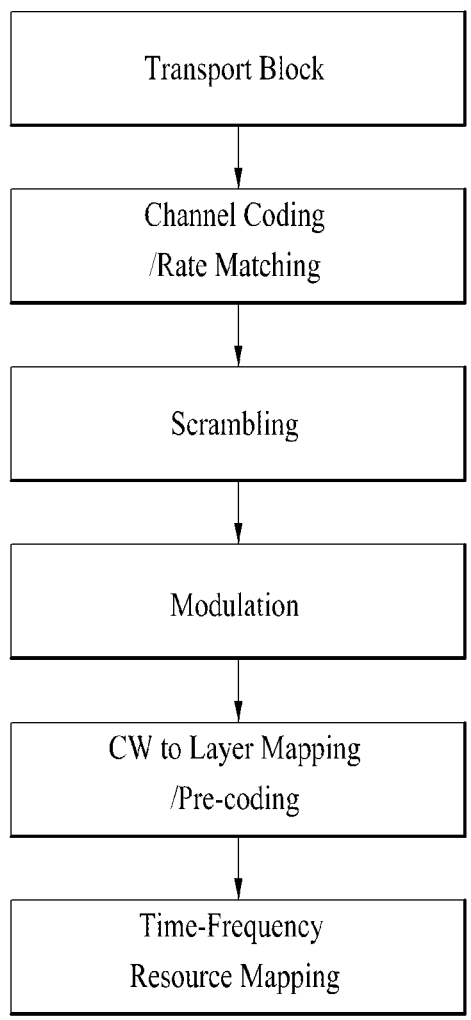
FIG. 5 is a flowchart illustrating a PDSCH transmission procedure.

PDSCH is a physical layer channel to which a DL-SCH acting as a transport channel for transmitting actual user data and a PCH acting as a transport channel for transmitting paging information are mapped. The PDSCH transmission process may be shown in FIG. 5. Referring to FIG. 5, a DL-SCH or PCH transmission block is channel-coded and rate-matched, the rate-matched result is processed by a scrambling process based on each cell identifier number, and the scrambled result is then modulated. A sequence (i.e., a codeword) generated by the above-mentioned process is mapped to a layer as necessary, is precoded, and is mapped to time-frequency resources, so that the mapped result is then transmitted.

In order to encode/output a DL-SCH and PCH transport block, the transport block is segmented into one or more code blocks, and the segmented code blocks are transmitted. For convenience of a decoding process and reduction of UE power consumption, Cyclic Redundancy Check (CRC) is attached to each code block. Otherwise, after all code blocks are completely received and CRC of a transport block is checked, it is determined whether an error occurs in one transport block. In contrast, under the condition that CRC is attached to each code block, when the presence of an error is decided after reception of one code block, this means the presence of an error in the corresponding transport block. Therefore, it is not necessary to decode the next code blocks of the corresponding transport block. Therefore, a transport block CRC (TB-CRC) is added to the transport block mapped to a PDSCH, the added result is segmented into one or more code blocks, CRC (CB-CRC) is added to each code block, and the CRC added result is channel-encoded through a turbo encoder having a code rate of 1/3. In this case, although each of a TB-CBC and a CB-CBC is 24 bits long, the TB-CRC and the CR-CRC can be generated using different generation polynomial expressions so as to enhance reception (Rx) performance. The above-mentioned code block segmentation will hereinafter be described with reference to FIG. 6.

Figure 6:
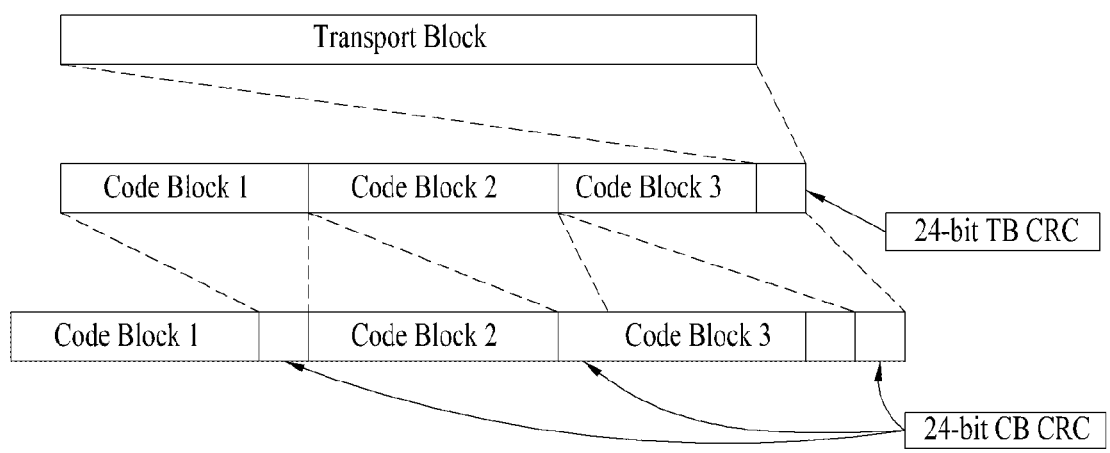
FIG. 6 is a conceptual diagram illustrating segmentation of a transmission block.

Referring to FIG. 6, one transport block (TB) is segmented into three code blocks. In this case, TB segmentation must be achieved in a manner that three code blocks have the same or similar length. If a given transport block has a predetermined size, the number of TB-CRCs and the number of virtual CB-CRCs are pre-calculated, so that a bit capable of equally dividing the TB-CRCs and the CB-CRCs. One TB may be segmented into code blocks having a maximum of two different lengths. The number and length of segmented code blocks need to be decided to be a maximum number of bits in consideration of the size of an internal interleaver of a turbo encoder. In this instance, only a predefined size may be used as the maximum number of bits. A maximum value of the length of a predefined code block is 6144 bits.

Thereafter, each systematic information from the turbo encoder and two pieces of parity information are respectively interleaved through the block interleaver. First parity information and second parity information from among two interleaved pieces of parity information are alternately mixed one bit by one bit. Data encoded by the above processing is stored in a memory buffer for HARQ management. In this case, according to the order of storing data in the HARQ buffer, interleaved systematic information is first placed, and the interleaved parity information in which one bit of the first parity information and one bit of the second parity information are mixed is then stored in the HARQ buffer.

In the case of data encoded by the turbo encoder having a code rate of 1/3 stored in the HARQ buffer, a predetermined amount of the encoded data needed for the HARQ buffer may be transmitted according to a transmit (Tx) code rate scheduled by the BS (or eNB) in response to a channel state of the UE. When information is read from the HARQ buffer acting as a circular memory buffer, if it is necessary to read much more information after the last data stored in the HARQ buffer is completely read, data stored in the HARQ buffer is sequentially read in order of a first data part to the last data part.

Data transmitted through an actual physical layer is read from the HARQ buffer by a transmission (Tx) code rate and a redundancy version (RV) number, and then transmitted. In this case, the transmission (Tx) code rate may indicate the amount of data to be read from the HARQ buffer, and the RV number may indicate a start position at which data must be read from the HARQ buffer. In LTE, 4 RVs (RV0, RV1, RV2, RV3) are defined, and the start position of the HARQ buffer indicated by each RV may divide the entire HARQ buffer into four equal parts. Specifically, a first RV starts operation at a specific point spaced apart from the first start point by a slight offset. Therefore, a start point corresponding to the remaining RVs is also spaced apart from each other by the above offset.

The base station (BS) receives channel quality information of each RB of each UE on uplink, and applies AMC (Adaptive Modulation and Coding) based on the channel quality information to a PDSCH transmitted on downlink. An instantaneous channel quality of the UE is frequently changed, and MCS (Modulation and Coding Set) different from that of initial transmission may also be applied to a retransmission process. The MCS index is mapped to a modulation order and a transport block (TB) length index. In LTE, 27 TB-length indexes are defined for each RB, so that a maximum of (27×110) TB lengths is defined. The TB lengths may be implicitly signaled through RB allocation information and MCS index that are transferred to the UE over a PDCCH.

A maximum TB length defined in the LTE system is 75376 bits when the TB is not spatially multiplexed to two layers. When the TB is spatially multiplexed to two layers, a maximum TB length defined in the LTE system is 149776 bits. A maximum TB length defined in double-layered spatial multiplexing is defined to satisfy a peak rate of 300 Mbps when 4×4 MIMO is used.

It is assumed that the number of downlink Tx antennas for use in the LTE system is set to 1, 2 or 4, and it is also assumed that the number of reception (Rx) antennas is set to 2 or 4. Therefore, if there are two or more Tx antennas, a MIMO system is operated/managed. PDSCH is multiplexed to a plurality of antennas and then transmitted, and the PDSCH is transmitted according to the spatial multiplexing and Tx diversity scheme on the basis of a channel state and the number of codewords. In addition, a UE-specific RS for a specific UE is allocated so that beamforming for the UE is also supported.

Reference Signal (RS)

In a wireless communication system, since packets are transmitted through a radio channel, a signal may be distorted during transmission. In order to enable a reception side to correctly receive the distorted signal, distortion of the received signal should be corrected using channel information. In order to detect the channel information, a method of transmitting a signal, of which both the transmission side and the reception side are aware, and detecting channel information using a distortion degree when the signal is received through a channel is mainly used. The above signal is referred to as a pilot signal or a reference signal (RS).

When transmitting and receiving data using multiple antennas, the channel states between the transmission antennas and the reception antennas should be detected in order to correctly receive the signal. Accordingly, each transmission antenna has an individual RS. In more detail, an independent RS should be transmitted through each Tx port.

RSs may be divided into downlink RSs and uplink RSs. In the current LTE system, the uplink RSs include:

i) DeModulation-Reference Signal (DM-RS) used for channel estimation for coherent demodulation of information delivered on a PUSCH and a PUCCH; and ii) Sounding Reference Signal (SRS) used for a BS (eNB) or a network to measure the quality of an uplink channel in a different frequency.

The downlink RSs are categorized into:

i) Cell-specific Reference Signal (CRS) shared among all UEs of a cell;

ii) UE-specific RS dedicated to a specific UE;

iii) DM-RS used for coherent demodulation of a PDSCH, when the PDSCH is transmitted;

iv) Channel State Information-Reference Signal (CSI-RS) carrying CSI, when downlink DM-RSs are transmitted;

v) Multimedia Broadcast Single Frequency Network (MBSFN) RS used for coherent demodulation of a signal transmitted in MBSFN mode; and vi) positioning RS used to estimate geographical position information about a UE (i.e., to geolocate a UE).

RSs may also be divided into two types according to their purposes: RS for channel information acquisition and RS for data demodulation. Since its purpose lies in that a UE acquires downlink channel information, the former should be transmitted in a broad band and received even by a UE that does not receive downlink data in a specific subframe. This RS is also used in situations such as handover. The latter is an RS that a BS (eNB) transmits along with downlink data in specific resources. A UE can demodulate the data by measuring a channel using the RS. This RS should be transmitted in a data transmission area.

CRSs serve two purposes, namely, channel information acquisition and data demodulation. A UE-specific RS is used only for data demodulation. CRSs are transmitted in every subframe in a broad band and CRSs for up to four antenna ports are transmitted according to the number of Tx antennas in an eNB.

For example, if the BS (eNB) has two Tx antennas, CRSs for antenna ports 0 and 1 are transmitted. In the case of four Tx antennas, CRSs for antenna ports 0 to 3 are respectively transmitted.

FIG. 7 illustrates patterns in which CRSs and DRSs are mapped to a downlink RB pair, as defined in a legacy 3GPP LTE system (e.g. Release-8). An RS mapping unit, i.e. a downlink RB pair may include one subframe in time by 12 subcarriers in frequency. That is, an RB pair includes 14 OFDM symbols in time in the case of the normal CP (see FIG. 7(a)) and 12 OFDM symbols in time in the case of the extended CP (see FIG. 7(b)).

In FIG. 7, the positions of RSs in an RB pair for a system where a BS (eNB) supports four Tx antennas are illustrated. Reference numerals 0, 1, 2 and 3 denote the REs of CRSs for first to fourth antenna ports, antenna port 0 to antenna port 3, respectively, and reference character 'D' denotes the positions of DRSs.

CSI (Channel Status Information) Feedback

MIMO schemes are classified into an open-loop MIMO scheme and a closed-loop MIMO scheme. The open-loop MIMO scheme means that a transmitter performs MIMO transmission without receiving CSI feedback information from a MIMO receiver. The closed-loop MIMO scheme means that a transmitter receives CSI feedback information from the MIMO receiver and performs MIMO transmission. In accordance with the closed-loop MIMO scheme, each of a transmitter and a receiver can perform beamforming on the basis of CSI so as to obtain a multiplexing gain of a MIMO transmission antenna. The transmitter (for example, BS) can allocate an uplink control channel or an uplink shared channel to a receiver (for example, a user equipment) in such a manner that the receiver can feed back the CSI.

The feedback CSI may include a rank indicator (RI), a precoding matrix index (PMI), and a channel quality indicator (CQI).

RI is information on a channel rank. The channel rank means a maximum number of layers (or streams) via which different information can be transmitted through the same time-frequency resources. Since a rank value is determined depending on long-term fading of a channel, the rank value is generally fed back for a longer period than PMI and CQI. That is, the rank value can be fed back less frequently than PMI and CQI.

PMI is information regarding a precoding matrix used for data transmission from the transmitter, and includes spatial characteristics of a channel. Precoding means that a transmit layer is mapped to a transmit antenna, and the layer-antenna mapping relationship can be determined by precoding matrices. PMI corresponds to a UE-preferred precoding matrix index of a BS on the basis of metric data such as Signal-to-Interference plus Noise Ratio (SINR). In order to reduce feedback overhead of the precoding information, a transmitter and a receiver may share a variety of precoding matrices in advance, and only indices indicating a specific precoding matrix from among the corresponding codebook can be fed back.

Acquisition of additional multi-user diversity using Multi-User MIMO (MU-MIMO) is under consideration in a system supporting an extended antenna configuration (e.g. an LTE-A system). In MU-MIMO, an interference channel exists between UEs multiplexed in an antenna domain. Therefore, when the eNB transmits a downlink signal based on CSI feedback received from one UE, it needs to perform the downlink transmission in a manner that avoids interference with other UEs. Hence, for reliable MU-MIMO operation, CSI should be fed back with more accuracy than in a Single-User MIMO (SU-MIMO) operation.

To enable more accurate CSI measurement and reporting, a new CSI feedback scheme may be used by improving conventional CSI including an RI, a PMI, and a CQI. For example, precoding information fed back by a receiver may be indicated by a combination of two PMIs. One of the two PMIs (a first PMI) may be referred to as W1 having a long term and/or wideband property and the other PMI (a second PMI) may be referred to as W1 having a short term and/or subband property. A final PMI may be determined by a function of W1 and W2. For example, let the final PMI be denoted by W. Then it may defined that W=W1*W2 or W=W2*W1.

CQI is information indicating channel quality or channel strength. CQI may be represented by a combination of predetermined MCSs. That is, a feedback CQI index may indicate a modulation scheme and a code rate. Generally, a reception SINR capable of being obtained when the BS constructs a spatial channel using a PMI is applied to CQI.

The current LTE/LTE-A system defines 'CSI reference resource' related to channel measurement for the above-described CSI feedback/reporting. The CSI reference resource is defined by a group of physical RBs corresponding to a frequency band for which a CQI is calculated in the frequency domain. From a time perspective, for CSI transmission/reporting in subframe n, the CSI reference resource is defined by a single downlink subframe, $n-n_{CQI\_ref}$. i) For periodic CSI reporting, $n-n_{CQI\_ref}$ is the smallest value greater than or equal to 4, which is a valid downlink subframe. ii) For aperiodic CSI reporting, $n-n_{CQI\_ref}$ ref is typically the reference resource in the same valid downlink subframe as a corresponding CSI request in a DCI format for uplink transmissions. iii) For aperiodic CSI reporting triggered by a Random Access Response Grant carrying a CSI request, $n-n_{CQI\_ref}$ equals 4. A downlink subframe is considered valid when it is configured as a downlink subframe for a particular UE, it is not an MBSFN subframe except for Mode 9, it contains a DwPTS with a predetermined size or larger, it does not fall within a configured measurement gap for that UE, and for periodic CSI reporting, it should be an element of a CSI subframe set when that UE is configured with CSI subframe sets. A higher layer may configure CSI subframe sets ($C_{CSI,0}$, $C_{CSI,1}$) for the UE. The current standard defines that the CSI reference resource is included in one of the two CSI subframe sets ($C_{CSI,0}$, $C_{CSI,1}$), not in both.

Heterogeneous Deployment

Figure 8:
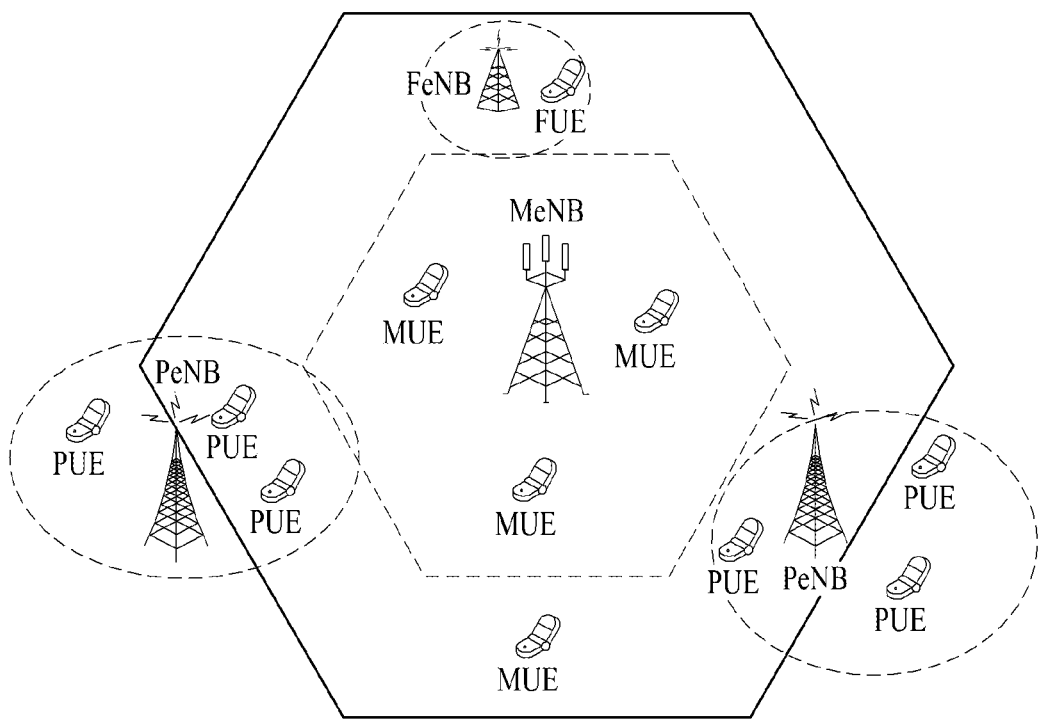
FIG. 8 is a conceptual diagram illustrating a cooperative transmission cluster.

FIG. 8 is a heterogeneous network wireless communication system including a macro eNB (MeNB) and a micro eNB (PeNB or FeNB). The term "heterogeneous network" refers to a network in which a macro eNB (MeNB) and a micro eNB (PeNB or FeNB) coexist even though the same Radio Access Technology (RAT) is used.

The macro eNB (MeNB) is a normal eNB having wide coverage and high transmission power in a wireless communication system. The macro eNB (MeNB) may also be referred to as a macro cell.

The micro eNB (PeNB or FeNB) may also be referred to as a micro cell, a pico cell, a femto cell, a home eNB (HeNB), a relay, etc. (MeNB, PeNB and FeNB may also be generically named a transmission point as necessary). The micro eNB (PeNB or FeNB) is a small-sized version of the macro eNB (MeNB), such that the micro eNB (PeNB or FeNB) may independently perform most of the functions of the macro eNB (MeNB). The micro eNB (PeNB or FeNB) may be installed (in an overlay manner) in an area covered by the macro eNB (MeNB) or may be installed (in a non-overlay manner) in a shadow area that cannot be covered by the macro eNB (MeNB). The micro eNB (PeNB or FeNB) has a narrower coverage and lower transmission power and may accommodate a smaller number of user equipments (UEs), compared to the micro eNB (MeNB).

UE, which is hereinafter referred to as a macro UE (MUE), may be directly served by the macro eNB (MeNB). UE, which is hereinafter referred to as a micro UE (MUE), may be served by the micro eNB (PeNB or FeNB). In some cases, the UE present within the coverage of the micro eNB (MeNB) may be served by the macro eNB (MeNB).

The micro eNB (eNB) may be classified into two types according to access limitations of the UE.

The first type is a Closed Subscriber Group (CSG) or non-Closed Access Subscriber Group (non-CSG) eNB serving as a cell that allows either a legacy macro UE or another micro eNB to access a micro UE. The legacy macro UE (MUE) or the like may be handed over to an OSG-type eNB.

The second type is a CSG eNB that prevents the legacy macro UE or another micro eNB from accessing the micro UE, such that it is impossible to hand over to the CSG eNB.

Coordinated Multi-Point (CoMP)

According to the improved system performance requirements of the 3GPP LTE-A system, CoMP transmission/reception technology (what may be referred to as co-MIMO, collaborative MIMO or network MIMO) is proposed. The CoMP technology can increase the performance of a UE located at a cell edge and increase average sector throughput.

In general, in a multi-cell environment in which a frequency reuse factor is 1, the performance of the UE located at the cell edge and average sector throughput may be reduced due to Inter-Cell Interference (ICI). In order to reduce the ICI, in the existing LTE system, a method of enabling the UE located at the cell edge to have appropriate throughput and performance using a simple passive method such as Fractional Frequency Reuse (FFR) through the UE-specific power control in the environment restricted by interference is applied. However, rather than decreasing the use of frequency resources per cell, the ICI is preferably reduced or the UE reuses the ICI as a desired signal. In order to accomplish the above object, a CoMP transmission scheme may be applied.

The CoMP scheme applicable to downlink may be largely classified into a Joint Processing (JP) scheme and a Coordinated Scheduling/Beamforming (CS/CB) scheme.

In the JP scheme, each point (eNodeB) of a CoMP unit may use data. The CoMP unit refers to a set of eNodeBs used in the CoMP scheme. The JP scheme may be classified into a joint transmission scheme and a dynamic cell selection scheme.

The joint transmission scheme refers to a scheme for transmitting a PDSCH from a plurality of points (a part or the whole of the CoMP unit). That is, data transmitted to a single UE may be simultaneously transmitted from a plurality of transmission points. According to the joint transmission scheme, it is possible to coherently or non-coherently improve the quality of the received signals and to actively eliminate interference with another UE.

The dynamic cell selection scheme refers to a scheme for transmitting a PDSCH from one point (of the CoMP unit). That is, data transmitted to a single UE at a specific time is transmitted from one point and the other points in the cooperative unit at that time do not transmit data to the UE. The point for transmitting the data to the UE may be dynamically selected.

According to the CS/CB scheme, the CoMP units may cooperatively perform beamforming of data transmission to a single UE. Although only a serving cell transmits the data, user scheduling/beamforming may be determined by the coordination of the cells of the CoMP unit.

In uplink, coordinated multi-point reception refers to reception of a signal transmitted by coordination of a plurality of geographically separated points. The CoMP scheme applicable to uplink may be classified into Joint Reception (JR) and Coordinated Scheduling/Beamforming (CS/CB).

The JR scheme indicates that a plurality of reception points receives a signal transmitted through a PUSCH, the CS/CB scheme indicates that only one point receives a PUSCH, and user scheduling/beamforming is determined by coordination of the cells of the CoMP unit.

In this CoMP system, multi-cell BSs (eNBs) can support data for a UE. In addition, the BSs (eNBs) support one or more UEs simultaneously in the same radio frequency resources, thereby increasing system performance. The BSs (eNBs) may also operate in Space Division Multiple Access (SDMA) mode based on CSI between a UE and the eNBs.

A serving BS (eNB) and one or more cooperative BSs (eNBs) are connected to a scheduler through a backbone network in the CoMP system. The scheduler may receive channel information about the channel states between a UE and the cooperative eNBs, measured by each cooperative BS (eNB) and operate based on the channel information. For example, the scheduler may schedule information for cooperative MIMO for the serving BS (eNB) and the one or more cooperative BSs (eNBs). That is, the scheduler may transmit a command directly to each eNB with regard to the cooperative MIMO operation.

As can be seen from the above description, it can be recognized that a CoMP system operates as a virtual MIMO system by grouping a plurality of cells into one group. Basically, the CoMP system adopts a MIMO communication scheme using multiple antennas.

Figure 9:
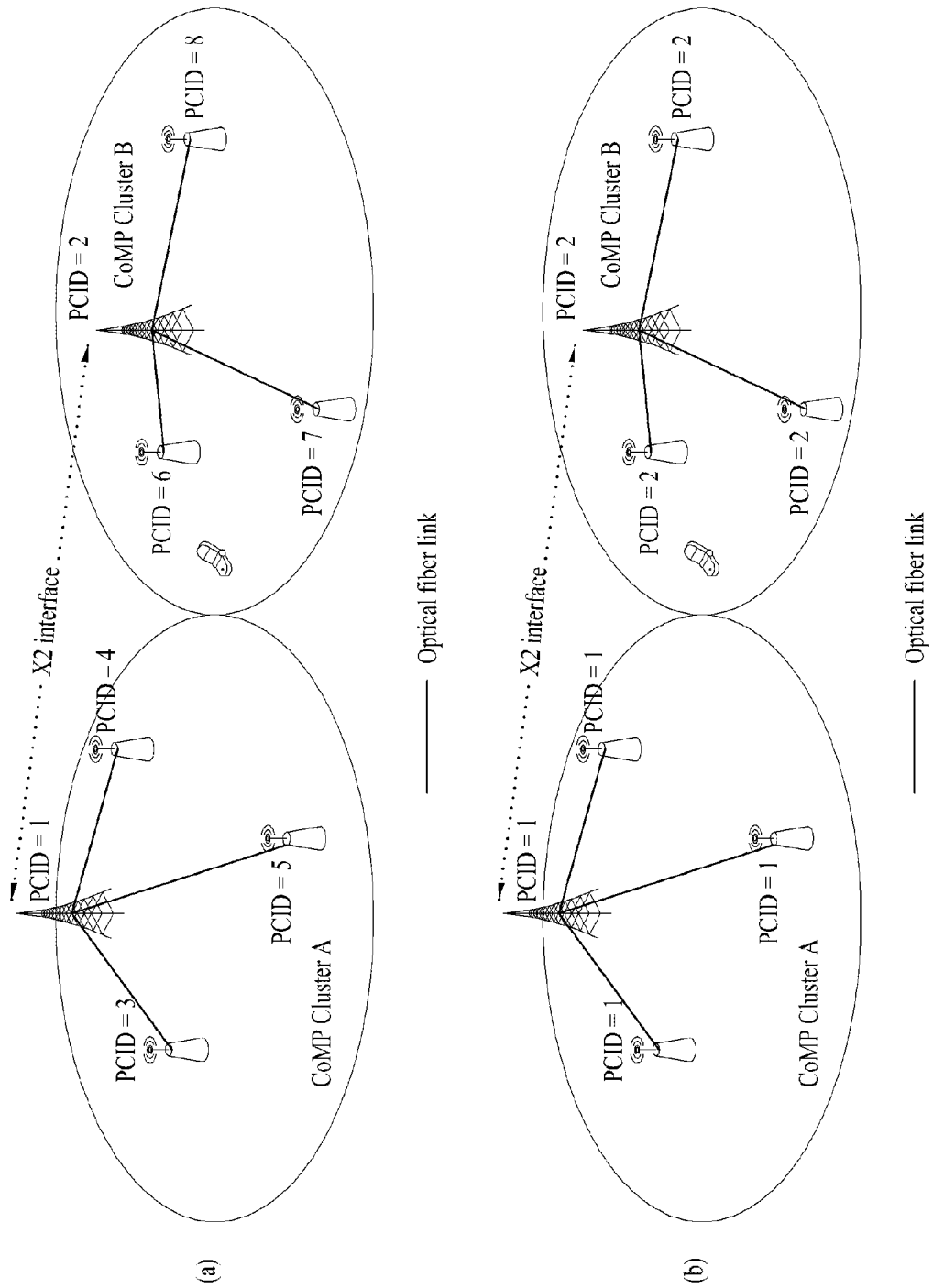
FIG. 9 is a conceptual diagram illustrating exemplary Coordinated Multi-Point (CoMP) clusters.
Figure 10:
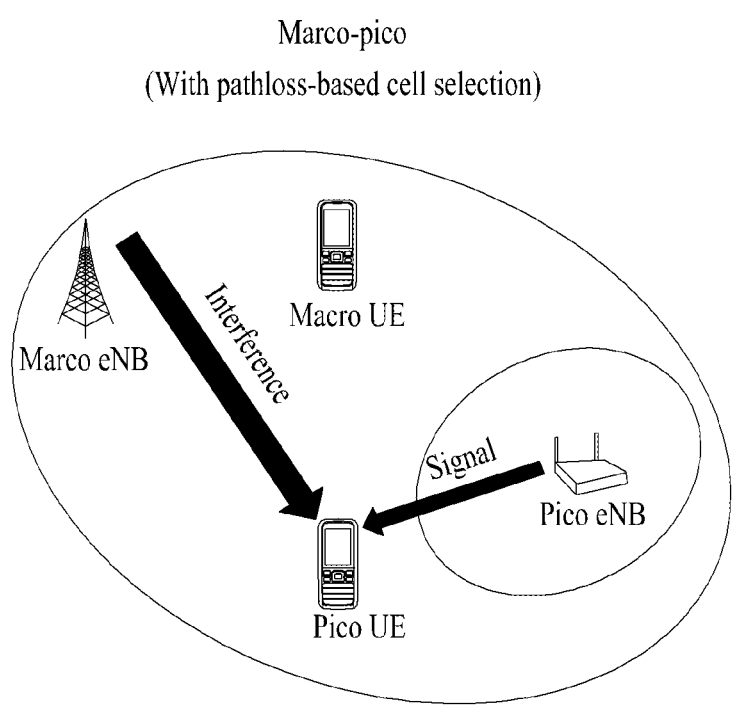
FIG. 10 is a conceptual diagram illustrating restricted measurement.

A CoMP cluster is a set of cells that are capable of performing the CoMP operations (i.e., cooperative scheduling and cooperative data transmission/reception). For example, cells of a single cluster may be assigned different physical cell IDs (PCIDs) as shown in FIG. 9(a), and cells of a single cluster may share the same PCIDs such that the cells may be configured in the form of a distributed antenna or RRH of a single BS. In modified examples of FIG. 7, some cells from among cells of the single cluster may share the same PCIDs.

Generally, cells of the same CoMP cluster are interconnected through a backhaul link, such as an optical fiber having high capacity and low latency, so as to implement cooperative scheduling and cooperative data transmission/reception, such that cooperative scheduling is possible and maintained at a correct time synchronization state, resulting in implementation of cooperative data transmission. In addition, upon receiving signals from cells of the CoMP cluster participating in cooperative transmission, CoMP cluster size must be determined in a manner that a reception time difference between signals transmitted from respective cells can enter the scope of a cyclic prefix (CP) length on the basis of a propagation delay difference between respective cells. In contrast, cells belonging to different clusters may be interconnected through a lower-capacity backhaul link, and may not maintain time synchronization.

A UE configured to perform CoMP can perform cooperative scheduling and cooperative data transmission/reception by some or all of cells contained in the CoMP cluster, and the UE measures a reference signal that is transmitted from some or all cells of the CoMP cluster according to UE reception signal quality (i.e., QoS of a UE reception signal). In order to measure link performances of a UE and each cell, the UE may measure a reference signal of each cell and may report a QoS of the measured reference signal. Specifically, cells to be measured by the UE may be defined as a CoMP measurement set.

For CoMP, there is a need to define the reference resource set through which UE channel measurement and UE channel measurement reporting must be performed, because the CoMP scheme and downlink scheduling, etc. of the corresponding UE are determined according to per-cell channel information to be reported by the UE on uplink. Information (i.e., the CoMP measurement set) indicating that the UE must measure/report signals from a certain cell should be transferred through higher layer signaling, and associated information can be signaled as CSI-RS resources.

Inter-Cell Interference Coordination (ICIC)

In the above-mentioned heterogeneous network environment (heterogeneous deployment) or CoMP environment, inter-cell interference (ICI) may occur. In order to solve the inter-cell interference (ICI) problem, inter-cell interference coordination (ICIC) may be used.

As exemplary ICIC of the frequency resource, the 3GPP LTE Release-8 system is designed to divide an overall frequency region (for example, a system bandwidth) into one or more sub-regions (for example, a physical resource block (PRB) unit), and a predetermined scheme for exchanging ICIC messages of individual frequency sub-regions between cells is defined in the 3GPP LTE Release-8 system. A variety of parameters may be contained in an ICIC message for frequency resources. For example, a Relative Narrowband Transmission Power (RNTP) related to downlink transmission power, uplink (UL) Interference Overhead Indication (IOI) related to uplink interference, UL High Interference Indication (HII), etc. may be defined in the ICIC message for frequency resources.

RNTP is information indicating downlink transmission power used in a specific frequency sub-region by a cell transmitting an ICIC message. For example, if an RNTP field for a specific frequency sub-region is set to a first value (for example, 0), this means that downlink transmission power of the corresponding cell does not exceed a predetermined threshold value in the corresponding frequency sub-region. Alternatively, if the RNTP field for the specific frequency sub-region is set to a second value (for example, 1), this means that the corresponding cell cannot promise downlink transmission power in the corresponding frequency sub-region. In other words, if the RNTP field is set to zero '0', this means that downlink transmission power of the corresponding cell is low in the corresponding frequency sub-region. Otherwise, if the RNTP field is set to 1, this means that downlink transmission power of the corresponding cell is not low in the corresponding frequency sub-region.

UL IOI is information indicating the amount of uplink interference experienced (or generated) in a specific frequency sub-region including a cell configured to transmit an ICIC message. For example, if an IOI field for a specific frequency sub-region has a high-interference amount, this means that the corresponding cell experiences high uplink interference in the corresponding frequency sub-region. In the frequency sub-region corresponding to an IOI indicating high uplink interference, the cell having received the ICIC message can schedule a UE that uses low uplink transmission power from among serving UEs of the cell. Therefore, since UEs perform uplink transmission at low transmission power in the frequency sub-region corresponding to an IOI indicating high uplink interference, uplink interference experienced by a neighbor cell (that is, a cell having transmitted the ICIC message) may be reduced.

UL HII indicates the degree of interference (or uplink interference sensitivity) that may be encountered in the corresponding frequency sub-region because of uplink transmission within a cell configured to transmit the ICIC message. For example, if the HII field is set to a first value (for example, 1) in a specific frequency sub-region, there is a high possibility of scheduling a high uplink transmission power UE by a cell for transmission of the ICIC message in the corresponding frequency sub-region. On the other hand, if the HII field is set to a second value (for example, 0) in a specific frequency sub-region, there is a possibility of scheduling a low uplink transmission power UE by the cell for transmission of the ICI message in the corresponding frequency sub-region. Meanwhile, if a UE is first scheduled in a frequency sub-region in which an HII is set to a second value (for example, 0) and some UEs capable of properly operating even under high interference are scheduled in another frequency sub-region in which an HII is set to a first value (for example, 1), one cell having received the ICIC message can avoid interference from another cell having transmitted the ICIC message.

On the other hand, as an exemplary ICIC of the time resource, the 3GPP LTE-A system (or 3GPP LTE Release-10) system is designed to divide an overall time region into one or more sub-regions (for example, a subframe unit) in a frequency domain, and a predetermined scheme for exchanging specific information indicating silencing or non-silencing of individual frequency sub-regions between cells is defined in the 3GPP LTE-A system. The cell having transmitted the ICIC message may transmit specific information indicating the presence of silencing in a specific subframe to neighbor cells, and does not schedule a PDSCH and a PUSCH in the corresponding subframe. On the other hand, the cell having received the ICIC message can schedule uplink transmission and/or downlink transmission for a UE on a subframe in which silencing is performed in another cell having transmitted the ICIC message.

Silencing may refer to an operation of a specific cell within a specific subframe. That is, the silencing operation indicates that a specific cell does not perform most of signal transmission on uplink or downlink of a specific subframe. If necessary, the silencing operation may also indicate that a specific cell can transmit signals at no power or low power on uplink and downlink of a specific subframe. As an example of the silencing operation, a specific cell may configure a specific subframe as a Multicast-Broadcast Single Frequency Network (MBSFN) subframe. In a downlink subframe configured as the MBSFN subframe, a signal is transmitted only in a control region and is not transmitted in a data region. As another example of the silencing operation, a cell causing interference may configure a specific frame as a specific Almost Blank Subframe (ABS) or an ABS-with-MBSFN. The ABS refers to a subframe in which only a CRS is transmitted in a control region and a data region of a downlink subframe and the remaining control information and data other than the CRS are not transmitted in the control and data regions of the downlink subframe. If necessary, signals are transmitted at no power or low power in the subframe corresponding to the ABS. Nonetheless, downlink channels and downlink signals such as a Physical Broadcast Channel (PBCH), a Primary Synchronization Signal (PSS), and a Secondary Synchronization Signal (SSS) may be transmitted even in the ABS. ABS-with-MBSFN may mean a subframe in which even the CRS is not transmitted in the data region of the above-described ABS. As described above, silencing may be performed in units of a specific subframe, and information indicating whether silencing is performed is referred to as a silent subframe pattern.

In association with ABS, ABS signaling defined in 3GPP LTE-A is largely classified into ABS information and ABS status. The ABS information indicates a subframe to be used as ABS using bitmap. The ABS information is composed of 40 bits in case of FDD, and is composed of a maximum of 70 bits in case of TDD. The number of bits used for ABS information in TDD may be changed according to UL-DL configuration. In case of FDD, 40 bits indicate 40 subframes. If the value of a bit is set to 1, the bit indicates ABS. If the value of a bit is set to zero, the bit indicates non-ABS. When restricted measurement is configured in a UE, the number of CRS antenna ports of the corresponding cell is notified for CRS measurement. A measurement subset is a subset of ABS pattern information. The measurement subset is a bitmap composed of 40 bits in case of FDD, and is a bitmap composed of a maximum of 70 bits in case of TDD. The above information can be understood as a restricted measurement for configuring restricted measurement. Table 1 indicates ABS information defined in the legacy LTE/LTE-A system.

TABLE 1

| IE/Group Name | Presence | Range | IE type and reference | Semantics description |
| --- | --- | --- | --- | --- |
| CHOICE ABS Information | M | — | — | |
| >FDD | | | — | — |
| >>ABS Pattern Info | M | | BIT STRING (SIZE(40)) | Each position of bitmap indicates a DL subframe, 1 indicates ABS, and 0 indicates a non-ABS. In a radio frame of SFN = 0, a first position of the ABS pattern corresponds to a subframe 0, and a maximum number of subframes is 40. |
| >>Number Of Cell-specific Antenna Ports | M | | ENUMERATED (1, 2, 4, . . .) | P- The number of antenna ports for cell-specific reference signal |
| >>Measurement Subset | M | | BIT STRING (SIZE(40)) | This indicates a subset of ABS pattern information, and may be used to configure specific measurement for UE. |
| >TDD | | | — | — |
| >>ABS Pattern Info | M | | BIT STRING (1 . . . 70, . . .) | Each position of bitmap indicates a DL subframe, 1 indicates ABS, and 0 indicates a non-ABS. A maximum number of subframes is |

TABLE 1-continued

| IE/Group Name | Presence | Range | IE type and reference | Semantics description |
|---|---|---|---|---|
| | | | | dependent upon UL/DL subframe configuration. In case of UL/DL subframe configurations 1~5, a maximum number of subframes is set to 20. In case of UL/DL subframe configuration 6, a maximum number of subframes is set to 60. In case of UL/DL subframe configuration 0, a maximum number of subframes is set to 70. A first position of an ABS pattern in the radio frame of SFN = 0 corresponds to Subframe 0. ABS pattern is continuously repeated in all radio frames, and restarts from SFN = 0. |
| >>Number Of Cell-specific Antenna Ports | M | | ENUMERATED (1, 2, 4, . . .) | P- The number of antenna ports for cell-specific reference signal |
| >>Measurement Subset | M | | BIT STRING (1 . . . 70, . . .) | This indicates a subset of ABS pattern information, and may be used to configure specific measurement for UE. |
| >ABS Inactive | M | | NULL | If ABS is deactivated, this means interference coordination. |

Table 2 shows ABS status information elements (IEs) defined in the legacy LTE/LTE-A system. The ABS status information elements are used to enable the eNB to determine whether the ABS pattern must be changed. In Table 2, 'Usable ABS Pattern Info' is bitmap information of a subset of ABS pattern information, and indicates whether a subframe designated as ABS has been correctly used for interference reduction. 'DL ABS status' indicates the ratio of the number of DL RBs scheduled in a subframe indicated by 'Usable ABS Pattern info' to the number of RBs allocated for a UE to be protected through ABS. 'DL ABS status' may also indicate whether ABS has been efficiently used in a victim cell according to purpose.

A measurement subset composed of a subset of an ABS pattern is a subframe statically used as ABS, and the remaining subframes contained in the ABS pattern may determine whether a transmission point will be used as the ABS according to traffic load.

Measurement/Measurement Report

A measurement report is used for many techniques designed to ensure the mobility of UEs (handover, random access, cell search, etc.) or for one of the techniques. Since the measurement report requires a certain degree of coherent demodulation, a UE may perform measurement after acquiring synchronization and physical layer parameters, except for measurement of a received signal strength. The measurement report conceptually covers Radio Resource Man-

TABLE 2

| IE/Group Name | Presence | Range | IE type and reference | Semantics description |
|---|---|---|---|---|
| DL ABS status | M | | INTEGER (0 . . . 100) | This means a percentage of ABS resources, and a numerator of percentage calculation is composed of RBs of ABS indicated by 'Usable ABS Pattern Info IE' allocated by eNB2. Denominator is a total number of RBs contained in ABS indicated by 'Usable ABS Pattern Info IE'. |
| CHOICE Usable ABS Information | M | | — | — |
| >FDD | | | — | — |
| >>Usable ABS Pattern Info | M | | BIT STRING (SIZE(40)) | Each position of bitmap indicates a DL subframe, 1 indicates ABS, and 0 indicates all other subframes. A pattern represented by bitmap is a subset corresponding to ABS Pattern Info IE carried in LOAD INFORMATION from eNB. |
| >TDD | | | — | — |
| >>Usable ABS Pattern Info | M | | BIT STRING (1 . . . 70) | Each position of bitmap indicates a subframe, 1 indicates ABS, and 0 indicates all other subframes. A pattern represented by bitmap is a subset corresponding to ABS Pattern Info IE carried in LOAD INFORMATION from eNB. | agement (RRM) measurement of measuring the signal strengths or signal strengths to total reception power of a serving cell and neighbor cells, including Reference Signal Received Power (RSRP), Received Signal Strength Indicator (RSSI), and Reference Signal Received Quality (RSRQ), and Radio Link Monitoring (RLM) measurement of measuring link quality with respect to the serving cell to thereby determine whether a radio link has failed.

In association with Radio Resource Management (RRM), RSRP is defined as the linear average over the power contributions of REs that carry downlink CRSs. RSSI is defined as the linear average of the total received power of a UE. The RSSI is measured from OFDM symbols carrying RSs for antenna port 0, including interference and noise power from neighbor cells. If a specific subframe is indicated for RSRQ measurement by higher-layer signaling, the RSSI is measured over all OFDM symbols of the indicated subframe. RSRQ is defined as (NxRSRP/RSSI), where N is the number of RBs over the measurement bandwidth of RSSI.

The purpose of RLM execution is to enable a UE to monitor downlink quality of its own serving cell, such that the UE can determine 'in-sync' or 'out-of-sync' of the corresponding cell. In this case, RLM is based on CRS. A downlink quality estimated by the UE is compared with each of 'in-sync threshold(Qin)' and 'out-of-sync threshold (Qout)'. Each threshold value may be denoted by a PDCCH BLER (Block Error Rate) of a serving cell. Specifically, Qout may correspond to a BLER of 10%, and Qin may correspond to a BLER of 2%. Actually, Qin and Qout correspond to SINR of the received CRS. If CRS reception SINR is equal to or higher than a predetermined level (Qin), the UE decides to attach the corresponding cell. If CRS reception SINR is less than a predetermined level (Qout), the UE declares radio link failure (RLF).

As can be seen from the above-mentioned RSRP definition, it should be premised that measurement reporting is performed using CRS. However, assuming that cells share the same PCID as shown in FIG. 9(b), the cells are unable to discriminate between the cells having the same PCID on the basis of the CRS, such that it is impossible to perform RRM of each cell using only measurement reporting including RSRP/RSRQ based on CRS. Therefore, assuming that cells have the same PCID, it is possible to perform additional RSRP/RSRQ measurement reporting on the basis of independently transmitted CSI-RS. In order to increase reception accuracy during CSI-RS reception of a specific cell, neighbor cells do not transmit signals to a resource element (RE) to which the corresponding CSI-RS is transmitted, such that the neighbor cells can perform higher-accuracy measurement although a frequency of CRS-RS transmission is less than a frequency of CRS transmission. Therefore, although cells have different PCIDs, CRS-based RSRP/RSRQ measurement reporting and CSI-RS RSRP/RSRQ measurement reporting are simultaneously performed, resulting in increased accuracy of network RRM.

Another purpose of CSR-RS transmission in each cell is to perform CSI feedback to be performed by a UE to aid scheduling of a BS (eNB) that determines a rank, precoding matrix, a modulation and coding scheme (MCS) or CQI to be used for DL data transmission between the corresponding cell and the UE. In accordance with the CoMP transmission scheme, the UE must feed back a CSI to a downlink related to a cooperative cell other than the serving cell. An excessive amount of overhead occurs when CSIs of all cells contained in the CoMP cluster including the serving cell are fed back, such that CSIs of some cells (i.e., CoMP measurement set) contained in the CoMP cluster that is valuable in cooperative scheduling and cooperative data transmission. Deciding the CoMP measurement set of a specific UE may be configured by selecting cells each having an RSRP of a predetermined level or higher. To achieve the above-mentioned operation, the UE performs RSRP measurement reporting of cells contained in the CoMP cluster including the UE. Alternatively, the BS sets configurations of CSI_RSs each of which will perform RSPR or RSRQ measurement to a CoMP measurement set, and informs the UE of the resultant configurations. The UE may perform RSRP or RSRQ measurement of CSI-RSs transmitted from cells contained in the CoMP management set. If the measurement result satisfies a specific condition, the UE may perform reporting.

In order to implement ICIC between CoMP clusters, a UE performs RSRP measurement and reporting of cells contained in a contiguous CoMP cluster, such that a network and a UE can recognize which one of cells of the contiguous CoMP cluster gives strong interference to the corresponding UE and can also recognize which one of cells receives strong UL interference from the corresponding UE.

In addition to CRS based RSRP/RSRQ measurement reporting for mobility management of UE handover, the CoMP measurement set configuration and the CSI-RS based RSRP/RSRQ measurement reporting for ICIC are simultaneously performed, such that accuracy and flexibility of network RRM can be increased.

Restricted Measurement

If a cell reduces a transmission (Tx) power of a specific resource region, a variation width of a per-resource-region interference signal received by a contiguous cell is increased. If averaging of the interference signals is achieved irrespective of a resource region, it is difficult to correctly obtain CoMP and ICIC effects. A detailed description of this will hereinafter be given with reference to FIG. 12.

Figure 12:
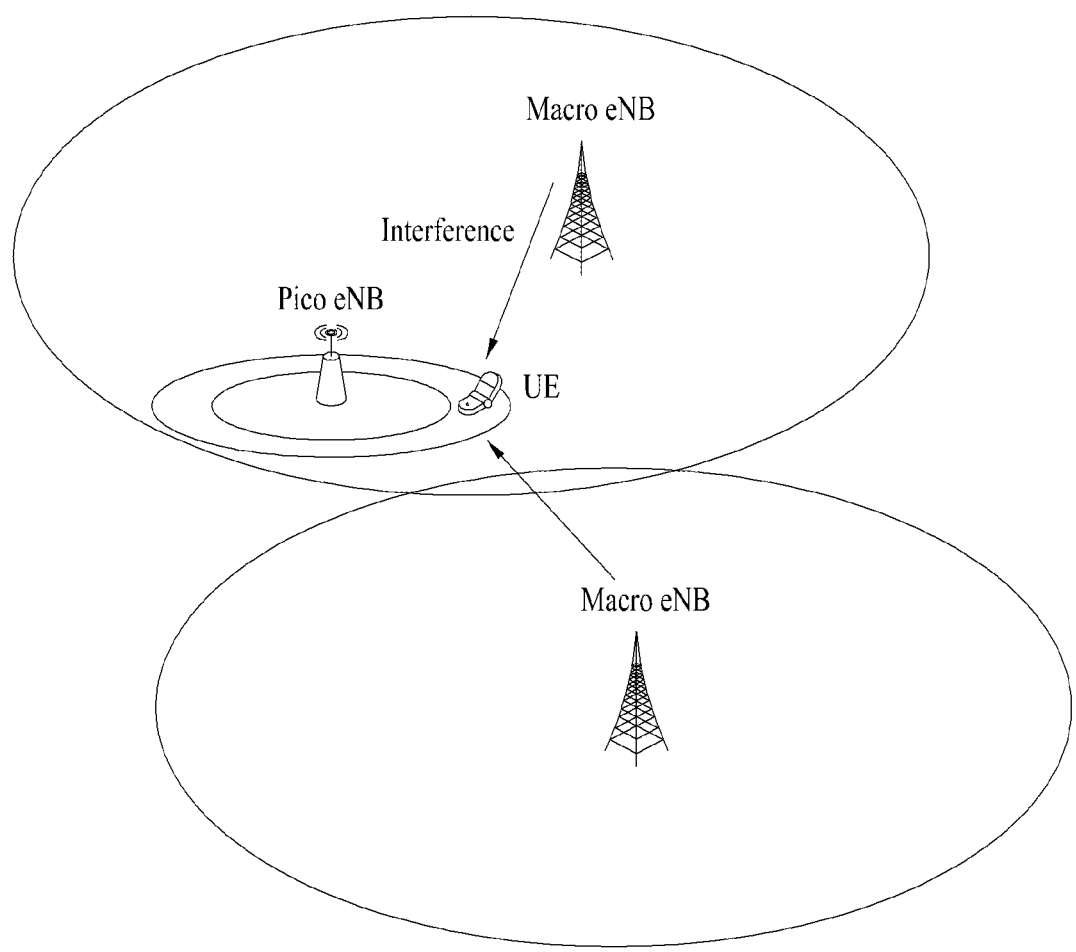
FIG. 12 is a conceptual diagram illustrating interference measurement according to an embodiment of the present invention.

Referring to FIG. 12, in case of a normal situation, a macro cell (macro eNB) is used as an aggressor cell of a pico cell (pico eNB). The macro cell (macro eNB) can guarantee/protect performance of the pico cell (pico eNB) using the aforementioned ABS for the pico cell or pico UE. In more detail, the macro cell can deboost a maximum of 9 bB transmission power in specific subframe(s), or may not transmit signals in the specific subframe(s), resulting in the cell range extension (CRE) effect of the pico cell. In other words, if a macro cell reduces a downlink transmission power in the ABS, a UE located in the vicinity of a cell edge of cells can recognize that performance of a picocell signal having been received with a noise level or lower in a normal subframe is increased in a manner that data can be stably received in the ABS, such that cell coverage of a pico cell can be actually extended.

Under this situation, restricted measurement may be used for measurement reporting. In other words, if the macro cell reduces transmission power in a specific subframe through the ABS, signals and/or interference level of the pico cell seen by the UE are greatly changed per subframe, and simple averaging of signals is prevented to introduction of the restricted measurement.

For such restricted measurement, if several CSI subframe sets (e.g., C0, C1) for channel measurement are used as a higher layer signal, the UE can perform channel measurement and reporting dedicated for the CSI subframe set. In addition, it is desirable that the UE perform ABS measurement of the macro cell for RLM/RRM.

Cell Range Extension (CRE)

Several small-sized pico eNBs (BSs) are installed in a coverage of the macro BS, such that UEs covered by the macro BS are handed over to the pico BS, resulting in traffic dispersion of the macro BS. Handover from a serving BS to a target BS is achieved when target-BS measurement result obtained from the UE is identical to or higher than a predetermined threshold value (Sth_conv). In this case, the network improves UE capability using arbitrary means, such that handover can be performed even though signal strength (e.g., SNR) of the target BS is less than a predetermined threshold. The above-mentioned operation may be referred to as cell range expansion (CRE). A CRE enable region is referred to as a CRE region/area, and the CRE region may be represented by a specific region in which reception performance ($S_{received}$) of a reference signal of the corresponding BS is higher than a new threshold value ($S_{th\_CRE}$) for CRE. That is, the CRE region configures the following equation 1.

$$S_{th\_conv} \geq S_{received} \geq S_{th\_CRE} \quad \text{[Equation 1]}$$

Figure 11:
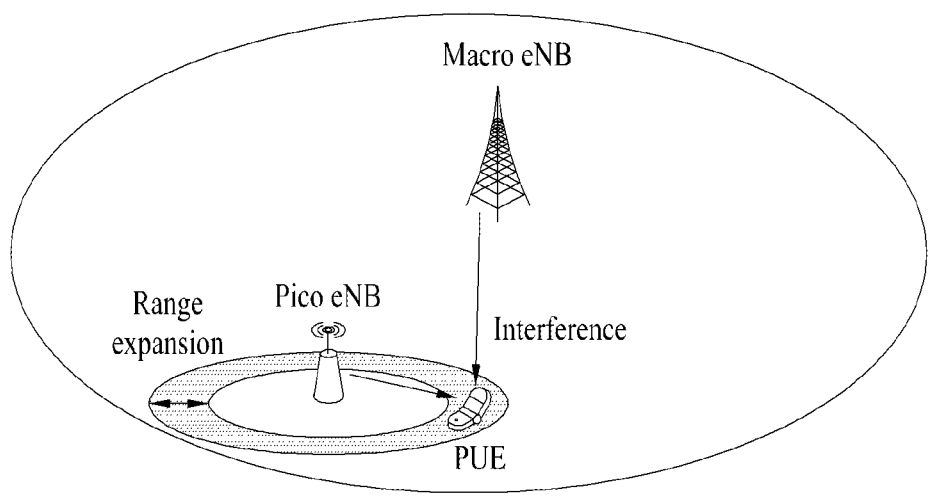
FIG. 11 is a conceptual diagram illustrating Cell Range Expansion (CRE).

Referring to FIG. 11 for better understanding of the present invention, a CRE region configured to satisfy Equation 1 may correspond to a shaded part.

In FIG. 11, a macro eNB enables a PUE located in the CRE region to be handed over to a pico eNB (PeNB), resulting in implementation of traffic offloading. As a result, overall system performance is improved. The CRE can extend a cell range or a cell radius of the corresponding eNB. In the legacy LTE/LTE-A system, a reference signal reception intensity of the PeNB may be denoted by RSRP/RSRQ, a reference for enabling the UE to attach a specific cell satisfies a specific condition in which a difference between the best RSRP and a specific cell RSRP is 6 dB or less on the basis of per-cell RSRP. However, in order to increase the traffic dispersion effect to the PeNB, the reference may be adjusted to 6 dB or higher (e.g., 9 dB). In this case, the operation (i.e., CRE) for enabling the UE to measure the PeNB, when the UE performs handover to the PeNB and then measures the PeNB acting as a serving cell, influence of interference caused by the macro eNB (that is located close to the PeNB and includes other BSs not shown in drawings) may be further increased unavoidably.

Therefore, the following description discloses a variety of methods for solving various interference problems encountered when a reference is higher than the CRE reference.

In the following description, the UE may have FeICIC (Further enhanced ICIC) capability capable of supporting FeICIC. In this case, FeICIC may indicate that a pico BS performs CRE of 6 dB or higher and a macro BS and a pico BS perform time/frequency ICIC. UE capability associated with FeICIC capability may include CRS IC capability (Number of CRSs to cancel) for CRS cancellation, PSS/SSS IC capability (Number of PSS/SSS to cancel) for PSS/SS interference cancellation of a neighbor cell, and PBCH IC capability (Number of PBCH to cancel) for PBCH interference cancellation of a neighbor cell (hereinafter, the UE capability related to FeICIC capability will hereinafter be referred to as CRE-related capability). UE capability information related to CRE may be transferred from the UE to a core network after completion of RRC connection. In more detail, the core network after completion of UE RRC connection may transmit UECapabilityEnquiry information to the UE through NAS (Not Access Stratum) signaling, and the UE may transmit UE capability information in response to the UECapabilityEnquiry information. The core network may transmit the UECapabilityEnquiry information as necessary.

In the following description, measurement may refer to at least one of RRM, RLM, and CSI, unless otherwise mentioned. Each of a neighbor cell for receiving interference and a serving cell for receiving interference will hereinafter be referred to as a weak cell or a victim cell, and an interfering cell will hereinafter be referred to as an aggressor cell.

CRS Handling Method of UE and CRS Information of Neighbor Cell Under Interference Situation Though an ABS of the macro BS, a pico-BS UE for use in the corresponding subframe can receive data/control channels under the situation in which the macro eNB has lower interference, and interference caused by CRS of the macro eNB is not reduced. Therefore, the UE can improve UE reception performance using a CRS interference cancellation/suppression method of the macro BS.

The UE has to recognize CRS information of a neighbor cell so as to cancel/suppress a CRS of the BS. That is, in order for the UE to perform CRS handling of a neighbor cell, there is a need for the UE to receive a cell ID of each cell in which the UE must perform the above operation, a number of CRS ports, information (i.e., MBSFN configuration) regarding a subframe needed for CRS transmission, and information regarding a bandwidth needed for CRS transmission of the corresponding cell. In more detail, the term "CRS handling" is a common name of various methods for cancelling/suppressing CRS interference of the macro BS, and the CRS handling may include rate matching of a transmitter, suppression or puncturing of the transceiver, or the like. Therefore, the macro BS may transmit CRS information to the UE, and the UE having received the CRS information may perform CRS handling only in a subframe, bandwidth, and RE for CRS transmission, A message "NeighborCellCRSInformation" for transmission of such information can be defined as the following table 4.

TABLE 4

NeighborCellCRSInformation ::= CHOICE {
   Cell ID
    { number of CRS ports,
     frequency information of CRS transmission,
     time information of CRS transmission }
}

A plurality of cell IDs may be transmitted through NeighborCellCRSInformation. In addition, "number of CRS ports" per cell ID, frequency information of CRS transmission, and time information of CRS transmission, etc. may be transmitted. Although the number of CRS ports for each cell ID must be transmitted, frequency information of CRS transmission and time information of CRS transmission may be transmitted as necessary. In this case, frequency information of CRS transmission may be used as frequency information needed for CRS transmission. For example, the frequency information of CRS transmission may be denoted by a center frequency and bandwidth of a specific cell, information regarding the number of PRBs needed for CRS transmission, and information regarding the position of the PRBs. Time information of CRS transmission may be denoted by a subframe needed for CRS transmission. For example, MBSFN subframe configuration may be used as the time information of CRS transmission.

MBSFN may not be configured according to the cell. In this case, it may be impossible to indicate MBSFN subframe configuration of the corresponding cell. Alternatively, although BSs do not exchange information in real time through an X2 interface and a specific cell configures an MBSFN, such information is not updated to other information and it is impossible to recognize the MBSFN subframe configuration of a specific cell of a serving cell so that the MBSFN may not be transmitted to a desired destination.

Therefore, if the UE receives only the number of CRS ports of a specific cell and does not receive the MBSFN subframe configuration, it may be assumed that the corresponding cell for all subframes may be used as MBSFN or it may also be assumed that all subframes are used as normal subframes as necessary. In accordance with the above assumption, the UE may perform cancellation/alleviation/puncturing/suppression/rate-matching for CRS of the corresponding cell only in the case of a normal subframe. However, although it is assumed that a neighbor cell is a normal subframe even though it is used as an MBSFN subframe, if the presence of CRS is assumed and CRS interference cancellation is carried out, a channel estimation error unavoidably increases. Therefore, if the UE does not recognize the MBSFN subframe configuration of a neighbor cell, it is assumed that the MBSFN subframe instead of a normal subframe is configured.

In another embodiment, if the UE receives the number of CRS ports of a neighbor cell and does not receive the MBSFN subframe configuration, the UE assumes that the corresponding cell uses all subframes as normal subframes and may perform only CRS puncturing without CRS interference cancellation.

In another embodiment, if the BS does not recognize the MBSFN subframe configuration of the neighbor cell, the MBSFN subframe configuration of the neighbor cell may not be transmitted as described above, and the BS transmits a certain configuration so that the UE can perform a designated operation. For example, when the BS transmits information corresponding to the MBSFN subframe configuration of a specific cell that does not recognize the MBSFN subframe configuration, it can be recognized that all subframes of the corresponding cell are used as normal subframes (or MBSFN subframes).

In another embodiment, information indicating whether the neighbor cell is an MBSFN configuration subframe may be signaled by the neighbor cell. The above information may include specific information capable of guaranteeing the MBSFN subframe configuration of the neighbor cell and/or subframe information indicating the presence or absence of the MBSFN subframe. The UE having received the above information does not use the CRS handling method for the MBSFN subframe of a specific cell, and may use the CRS handling method for a normal subframe instead of the MBSFN subframe (e.g., interference cancellation, rate matching, suppression, or puncturing of a transmitter, etc.). In contrast, within a specific subframe in which the serving cell cannot guarantee information indicating whether the MBSFN subframe is certainly configured by a specific BS, the UE may use the puncturing or the like without using interference cancellation from among the CRS handling schemes.

Method for Measuring UE Interference when Restricted Measurement is Configured

If CRSs of several cells collide with each other after the CRSs are transmitted from the same positions as those of a serving cell and a peripheral macro BS (i.e., if the CRS collision case occurs), the following method for performing CRS handling of the UE, and information/operations needed for the CRS handling will hereinafter be described. Specifically, if restricted measurement is configured, a method for measuring UE interference will hereinafter be described.

The following description can be applied to a user equipment (UE) shown in FIG. 12. Referring to FIG. 12, the UE may belong to a region (e.g., CRE region) of a pico eNB serving as a serving cell, and may be interfered with by neighbor macro eNBs (Macro eNB 1, Macro eNB 2). In this case, the macro eNBs contiguous to the pico eNB may cooperate with each other using ABS, RNTP, HII, IOI or the like. In addition, cells contiguous to the pico eNB may form a single CoMP cluster in a different way from the above example shown in the drawing. In addition, the following description may assume that the CRS of its own serving cell and the other CRS of a neighbor macro eNB are transmitted from the same position and CRSs of several cells collide with each other. In other words, the following description may assume the CRS collision case.

A method for performing interference measurement for CSI calculation of the UE (having interference cancellation capability) may perform CRS interference cancellation through CRS information (NeighborCellCRSInformation) of the above-mentioned neighbor cell, perform channel estimation on the basis of the CRS interference cancellation, so that CSI and data demodulation can be carried out. In this case, interference (I) indicating an interference measurement target may be represented by the following equation 2.

$$I = I_0 + I_{N\_CRS} \qquad \text{[Equation 2]}$$

$$= I_0 + \sum_k I_{C,k}$$

In Equation 2, I may denote interference measured at the CRS position of the serving cell, and $I_0$ may denote the remaining interference other than CRS interference of the neighbor cell from among the entire interference. In Equation 2, $I_{N\_CRS}$ may denote interference generated from a specific eNB. In case of the CRS collision case, $I_{N\_CRS}$ is CRS interference caused by a neighbor cell CRS transmitted from the position of its own serving cell CRS, and may be the sum of several CRS interferences when CRSs of several cells collide with each other. In this case, CRS interference of several cells constructing the value of $I_{N\_CRS}$ may denote CRS interference of the cell corresponding to the cell ID related to collision between the serving cell and the CRS from among the cell ID list to which CRS information of the neighbor cell is provided. The UE can recognize which eNB has a CRS that will collide with the serving cell CRS on the basis of the neighbor-cell CRS information received from the serving cell, and can measure/calculate interference of the colliding CRS on the basis of the recognized information. $I_{C,k}$ may denote the CRS interference of the k-th cell at which the serving cell and the CRS collide with each other.

Equation 2 may be rewritten as the following equation 3.

$$I = I_0 + \sum_k I_{C,k} \qquad \text{[Equation 3]}$$

$$= I_0 + \sum_k \Delta_k \cdot I_{N\_CRS}, k$$

In Equation 3, $I_{C,k}$ is CRS interference of the k-th cell in which the serving cell and the CRS collide with each other, and is corrected by $\Delta_k$ indicating a value capable of reflecting actual interference according to a subframe or a measurement subframe subset. $I_{N\_CRS,\,k}$ may denote CRS interference of the k-th neighbor cell. $\Delta_k$ is a weighting factor for the above $I_{N\_CRS,\,k}$ correction, and can decide how much the $I_{N\_CRS,\,k}$ value will be reflected in actual interference calculation. $\Delta_k$ is a representative value of a specific interference environment, and may be defined as a subframe-specific value. Although CRS interference cancellation is performed on the basis of neighbor-cell CRS information received by the UE, it may be difficult to correctly report the CRS. In more detail, although the UE performs CRS interference cancellation and interference caused by CRS of the neighbor cell can be removed, the neighbor-cell interference for the PDSCH region may still remain. For this purpose, a correction value corresponding to a PDSCH EPRE to CRS EPRE ratio or traffic load may be applied to this embodiment.

In the above-mentioned description, if restricted measurement is configured in the UE, i.e., if a first subframe set (C0) related to ABS and a second subframe set (C1) related to a normal subframe are configured in the UE, a weighting factor (i.e., a correction value) for the above correction may be configured in each subframe set (i.e., each measurement subset). For example, $\Delta k = \Delta_{k,C0}$ may be configured in the measurement subset C0, and $\Delta_k = \Delta_{k,C1}$ may be configured in the measurement subset C1.

As described above, if each correction value is configured in each measurement subset, interference measurement at each of the subsets (i.e., subframe sets C0 and C1) of the UE may be performed as follows.

The UE may calculate the CSI using interference obtained after CRS cancellation of a peripheral macro eNB is performed at the measurement subset C0, correct the CSI using a specific value ($\Delta_{k,C0}$) capable of reflecting actual interference, and report the corrected CSI to the eNB. In the case of CSI measurement for a measurement subset C1 of the UE, CSI is calculated using interference obtained after CRS cancellation of the peripheral macro eNB, CSI is corrected using a specific value ($\Delta_{k,C1}$) capable of reflecting the actual interference at the corresponding measurement subset, so that the CSI can be reported to the eNB. In this case, the correction values ($\Delta_{k,C0}$, $\Delta_{k,C1}$) for reflecting actual interference represents interference characteristics may be differently established according to the measurement subsets. Preferably, the correction values ($\Delta_{k,C0}$, $\Delta_{k,C1}$) may be represented by a PDSCH EPRE to CRS EPRE ratio for each measurement subset.

Specifically, a correction value of a specific measurement subset that is used as a normal subframe by peripheral cells may be set to 1 (e.g., a PDSCH EPRE to CRS EPRE ratio ($\rho_A$, $\rho_B$) in a normal subframe), and a correction value of a specific measurement subset that is used as ABS by peripheral macro eNBs may be set to zero (0) (e.g., a PDSCH EPRE to CRS EPRE ratio ($\rho_A'$, $\rho_B'$) in a subframe in which PDSCH is not scheduled). That is, $\Delta_{k,C0}$ may correspond to a PDSCH EPRE to CRS EPRE ratio value of the k-th cell at the measurement subset C0, and $\Delta_{k,C1}$ may correspond to a PDSCH EPRE to CRS EPRE ratio value of the k-th cell at the measurement subset C1.

The above values ($\Delta_{k,C0}$, $\Delta_{k,C1}$) are contained in CRS information of the neighbor cell, and the resultant CRS information may be transferred to the UE. The following Table 5 may exemplarily show the CRS information element of the neighbor cell.

TABLE 5

NeighborCellCRSInformation ::=   CHOICE {
  Cell ID
    { number of CRS ports,
      frequency information of CRS transmission,
      time information of CRS transmission,
      delta_C0,
      delta_C1}
}

In Table 5, delta_C0 ($\Delta_{k,C0}$) may correspond to a PDSCH EPRE to CRS EPRE ratio at the subframe set that is used as ABS by the eNB of the corresponding cell ID. delta_C1 ($\Delta_{k,C1}$) may denote a PDSCH EPRE to CRS EPRE ratio at a subframe set that is used as a normal subframe by the eNB of the corresponding cell ID.

In the meantime, the $\Delta_{k,C0}$ and $\Delta_{k,C1}$ values may represent interference of each measurement subset and load information of the interference cell. This value may be transferred to a destination through higher layer signaling.

As a representative example of the above values, $\Delta_{k,C0}$ and $\Delta_{k,C1}$ may be set to 0 and 1, respectively. If $\Delta_{k,C0}=0$ is given, this value ($\Delta_{k,C0}=0$) means representative interference generated when the neighbor cells reduce Tx power (including an exemplary case in which PDSCH Tx power of neighbor cells is set to zero) and perform PDSCH scheduling. If $\Delta_{k,C0}=1$ is given, this value ($\Delta_{k,C0}=1$) means representative interference generated when the neighbor cells perform PDSCH scheduling without reducing Tx power. CRS interference cancellation associated with the CRS collision case may not be performed in the above measurement subset.

In this case, an ABS configuration flag, that indicates whether the corresponding cell for each cell ID performs ABS configuration in cooperation with the serving cell, may be signaled to a NeighborCellCRSInformation message for transmitting CRS information of the neighbor cell.

TABLE 6

NeighborCellCRSInformation ::=   CHOICE {
  Cell ID
    { number of CRS ports,
      frequency information of CRS transmission,
      time information of CRS transmission,
      ABS configuration flag}
}

In association with the cell ID in which the ABS configuration flag is set, if CRS of the corresponding cell collides with CRS of the serving cell, the CRS interference cancellation to CRS of the corresponding cell is performed at the measurement subframe subset C0, and interference from the corresponding cell is corrected using the value of $\Delta_{k,C0}$ (for example, $\Delta_{k,C0}=0$). In association with the cell ID in which the ABS configuration flag is not set, if CRS of the corresponding cell collides with CRS of the serving cell, the CRS of the corresponding cell may not be cancelled at the measurement subframe subset C0. Although the CRS interference cancellation to CRS of the corresponding cell is performed, the subsequent correction value may not be set to zero. For example, this correction value may be denoted by $\Delta_{k,C0}=1$. That is, there is a possibility that ABS is not used in the measurement subframe subset C0 (i.e., a subframe set in which a peripheral macro eNB uses the ABS) of the corresponding cell.

If an additional ABS configuration flag is signaled as described above a correction value of interference may be decided according to the ABS configuration flag.

That is, if an ABS configuration flag of a specific cell is set to zero (0) (if the corresponding cell does not cooperate with the serving cell using the ABS), a correction value acting as the correction value ($\Delta_{k,C0}=\Delta_{k,C1}$) of the corresponding cell may be commonly applied to the measurement subframe. In this case, CRS interference cancellation of the corresponding cell is meaningless in all measurement subframe subsets. When the UE performs CSI calculation, CRS interference in the corresponding cell may not use cancellation or additional interference mitigation schemes.

In contrast, if the ABS configuration flag of a specific cell is set to 1 (if the corresponding cell cooperates with the serving cell using the ABS), an independent interference correction value of the corresponding cell may be assigned to each measurement subframe subset. In association with the above cell, at a subframe set (i.e., a measurement subframe subset C1) in which the corresponding cell is used as a normal subframe for PDSCH scheduling without Tx power reduction, CRS interference of the corresponding cell may not be cancelled and interference may be measured without CRS interference cancellation. In this case, it may be assumed that an interference correction value ($\Delta_{k,C1}$) at the measurement subframe subset C1 is set to 1 (on the assumption of "PDSCH EPRE to CRS EPRE ratio=1") by the UE without additional signaling. In contrast, only the interference correction value ($\Delta_{k,C0}$) at the measurement subframe subset C0 can be signaled to the UE.

Figure 13:
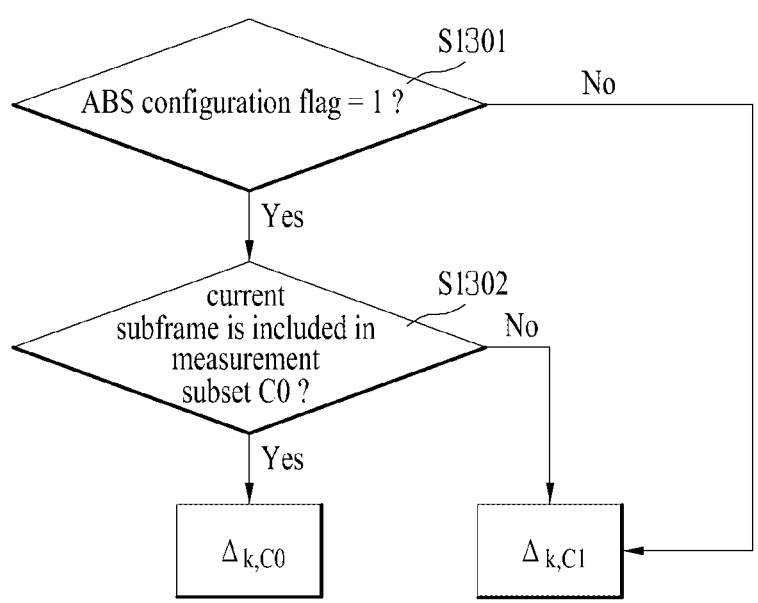
FIG. 13 is a flowchart illustrating a method for deciding a correction value according to an embodiment of the present invention.

If both the above ABS configuration flag and a correction value for each measurement subset are signaled, a method for deciding the correction value may be identical to those of FIG. 13. Referring to FIG. 13, a UE may confirm a value of the ABS configuration flag in step S1301. If the ABS configuration flag value is set to 1, the UE may determine which one of the measurement subsets (C0, C1) includes a current subframe in step S1302. In other words, the UE may determine whether the measurement subset C0 includes a current subframe. If the current subframe is contained in the measurement subset C0, the UE may decide the correction value to be $\Delta_{k,C0}$. If the current subframe is contained in the measurement subset C1, the UE may decide the correction value to be $\Delta_{k,C1}$. If the ABS configuration flag value is not set to 1, the UE may decide $\Delta_{k,C1}$ of all measurement subsets to be a correction value.

As described above, the PDSCH EPRE to CRS EPRE ratio for each cell in which CRS interference should be cancelled is signaled to the UE. In case of the CRS collision case, the UE performs CRS cancellation of a specific cell, and may correct actual interference using the PDSCH EPRE to CRS EPRE ratio value of the corresponding cell. Considering the signaling overhead aspect, an average interference correction value for each measurement subset may be signaled to measure CSI of the UE. In response to this average value, the UE may correct actual interference using different values of respective subsets after completion of CRS interference cancellation, so that the UE can perform CSI on the basis of the corrected result.

That is, Equations 2 and 3 may be approximated as shown in the following Table 4.

$$I = I_0 + I_{N\_CRS} \quad \text{[Equation 4]}$$
$$\approx I_0 + \Delta \cdot \sum_k I_{N\_CRS,k}$$
$$= I_0 + \Delta \cdot I_{N\_CRS}$$

In Equation 4, $\Delta=\Delta_{C0}$ may be given at the measurement subset C0, and $\Delta=\Delta_{C1}$ may be given at the measurement subset C1. $\Delta_{C0}$ may be a representative value for correcting interference of cells in which the CRS positions collide with each other, at the measurement subset C0. $\Delta_{C1}$ may be a representative value for correcting interference of cells in which the CRS positions collide with each other, at the measurement subset C1.

If the correction value is not explicitly signaled, the UE may assume that the PDSCH EPRE to CRS EPRE ratio of the neighbor cell is set to 1 (i.e., PDSCH EPRE=CRS EPRE), and may then calculate the CSI, so that a peripheral macro eNB can perform CSI measurement at the subframe set used as a normal subframe.

Alternatively, the UE may assume that the PDSCH EPRE to CRS EPRE ratio value for each measurement subframe subset of the UE's serving cell can also be applied to peripheral neighbor cells without change. Specifically, according to another method for calculating peripheral interference, the UE does not calculate interference using CRS interference cancellation, and may calculate the CSI using interference obtained when only CRS interference cancellation to CRS of the UE serving cell is performed. In this case, the operation and signaling for additional interference correction may no longer be required.

Alternatively, in order to measure the CSI of the subframe set that is used as a normal subframe by a peripheral macro eNB, interference is measured without CRS interference cancellation, CRS interference cancellation of the corresponding cells is performed only in the subframe set in which the peripheral macro eNBs use the ABS, interference is then measured, and actual interference is corrected using an additional value (A), resulting in CQI calculation.

Alternatively, the UE may measure the PDSCH EPRE to CRS EPRE ratio of the neighbor cell without additional signaling of the correction value ($\Delta_k$), so that the UE can calculate such interference. That is, the UE measures power at an OFDM symbol having no CRS. If the measured power is lower than power of the OFDM symbol including CRS by a predetermined value or higher, the UE may assume that the corresponding cell uses the ABS, cancels CRS of the corresponding cell and has to measure interference upon completion of CRS cancellation. In contrast, if this value is maintained at a similar level, CQI can be calculated without cancellation of the CRS of the corresponding cell.

Although the above-mentioned description has assumed the case in which the UE has a pico eNB acting as a serving cell, the above-mentioned operation and signaling are needed even in the case in which the UE receives services from the macro eNB. If plural measurement subsets for CSI calculation of the macro UE are configured, and if the CRS collision case is provided, interference correction and signal correction must be simultaneously carried out to perform CSI calculation. That is, in the network in which the macro eNB cooperatively uses the ABS, if a measurement subset representing interference characteristics is configured in the macro UE, the UE may perform the interference/signal correction process per measurement subset so that the UE may perform CSI calculation after completion of the CRS interference cancellation of the neighbor cell. For example, two measurement subsets (C0, C1) are configured (where, C0 may correspond to a subframe used as the ABS by macro eNBs each including a serving cell, and C1 may correspond to a subframe used as a normal subframe by peripheral macro eNBs each having a serving cell). If PDSCH Tx power of the serving cell is reduced at C0, the interference level is reduced according to the same operation of the peripheral macro eNBs.

Interference caused by CRS interference cancellation of the neighbor cell is corrected by a specific value ($\Delta_{C0}$)

reflecting actual interference, the serving cell signal is corrected on the basis of a PDSCH EPRE to CRS EPRE ratio value of the serving cell at the measurement subset C0 after completion of CRS estimation of the serving cell, and CSI calculation is then performed. In order to measure CSI at the measurement subset C1, the UE may correct interference that is caused by CRS interference cancellation of the neighbor cell, using a specific value ($\Delta_{C1}$) reflecting actual interference. However, CRS cancellation for CSI measurement at a measurement subframe subset represented as a normal subframe may be meaningless. For more correct interference measurement, the above method in which the UE performs CSI calculation using interference caused by CRS cancellation of the serving cell, can reduce calculation complexity and can also increase interference measurement accuracy.

On the other hand, the above-mentioned description has disclosed the case in which the UE does not perform CRS interference cancellation, the above case may also be explicitly signaled. In more detail, when the UE performs CSI calculation, an interference suppress flag indicating whether CRS interference cancellation needs to be performed for each measurement subset may be signaled.

The interference suppress flag may be decided according to the number of measurement subsets. For example, if two measurement subsets exist, the two measurement subsets may be denoted by two bits {b1, b2}. In this case, b1 may indicate whether CRS interference of the corresponding cell needs to be cancelled at the measurement subset C0, and b2 may indicate whether CRS interference of the corresponding cell needs to be cancelled at the measurement subset C1. In this case, a detailed example for use in the above case is shown in the following Table 7.

TABLE 7

| Interference suppress flag | interpretation |
|---|---|
| 00 | CRS IC is not allowed in measurement subset C0 and C1 |
| 01 | CRS IC is not allowed in measurement subset C0<br>CRS IC is allowed in measurement subset C1 |
| 10 | CRS IC is allowed in measurement subset C0<br>CRS IC is not allowed in measurement subset C1 |
| 11 | CRS IC is not allowed in measurement subset C0<br>CRS IC is not allowed in measurement subset C1 |

If two measurement subsets are present and the interference suppress flag is 1 bit log, the interference suppress flag may indicate whether CRS interference of the corresponding cell needs to be cancelled at the measurement subset C1. In more detail, if the measurement subset C0 is associated with the ABS, and if the measurement subset C1 is associated with a normal subframe, CRS interference cancellation is performed by a default at the measurement subset C0, and specific information indicating whether CRS interference cancellation is performed at the measurement subset C1 may be indicated through the interference suppress flag.

The rate matching from among CRS interference handling schemes for use in the transmitter will hereinafter be described in detail.

The eNB (BS) may perform rate matching of a resource region corresponding to CRS of the neighbor cell within a PDSCH region on the basis of CRS information of the neighbor cells contiguous to the BS (eNB). The BS may transmit the neighbor cell information message (NeighborCellCRSInformation) to the UE. Through the NeighborCellCRSInformation message, the UE recognizes the fact that a PDSCH of its own serving cell will be rate-matched. In this case, specific information indicating which position (RE) will be rate matched may be used as subframe information including a cell ID of the neighbor cell, a CRS port number, and a CRS, and the specific information may be indicated by the eNB.

In another example, the eNB may transmit an indicator for indicating whether serving cell data has been mapped to the CRS position of all neighbor cells indicated by the neighbor cell information message (NeighborCellCRSInformation), so that the UE can perform a data recovery action corresponding to the indicator.

In another example, the eNB may inform the UE of an actual PDSCH rate-matching position from among the neighbor cell information message (NeighborCellCRSInformation). The actual PDSCH rate-matching position is used as an additional indicator. That is, the UE having received CRS information of the neighbor cell may perform CRS interference cancellation or puncturing using the neighbor cell information message (NeighborCellCRSInformation) information according to UE receiver capabilities. In contrast, the eNB may indicate which cell includes the rate-matched CRS using an additional indicator, so that a specific RE is rate-matched during PDSCH reception so that CRS interference from a specific cell can be prevented from occurring. In this case, an additional indicator may be a list of cell IDs of cells that are rate-matched when the eNB performs PDSCH mapping.

In another example, the rate matching flag is added to the neighbor cell information message (NeighborCellCRSInformation), and the UE can indicate which cell has a CRS position at which a PDSCH of the serving cell is rate-matched. The rate matching flag may indicate whether a PDSCH is rate-matched to the CRS position of a specific cell. In this case, the UE may apply the interference mitigation method such as interference cancellation of the receiver to the CRS position of cells in which the rate matching flag is not configured.

In the above-mentioned description, the rate matching flag may indicate the presence or absence of a possibility that the CRS position of the corresponding cell will be rate-matched during PDSCH matching. That is, although the rate matching flag is set, this rate matching flag does not indicate that a PDSCH of the corresponding cell was certainly rate-matched, and may indicate the presence of a possibility of rate matching. During actual PDSCH transmission, the presence or absence of rate matching may also be indicated by a combination of information defined in DCI and RRC signaling.

In more detail, the UE may decide the cell ID contained in NeighborCellCRSInformation to be an interference resource, and may perform CRS cancellation of the CRS of the corresponding cell ID. However, the cell ID to be used as a target of CRS cancellation may correspond to the cell ID other than the rate-matched cell ID. That is, if signaling indicating the rate matching is present, although the corresponding cell is contained in a list of aggressor cells, the CRS IC operation for the corresponding cell is not performed. In this case, confirmation and indication of the rate matching operation may be achieved by 'Rate matching indicator bit'/'PDSCH RE mapping and Quasi Co Location Indicator' field of a DCI format'. In more detail, rate-matching pattern information pieces (e.g., a specific cell ID, the number of CRS ports, MBSFN construction, etc.) may be configured in the UE by RRC signaling, and any one of plural rate matching patterns may be indicated by a DCI format.

PDSCH RE Mapping of eNB/Tx Point Under CoMP Environment

Figure 14:
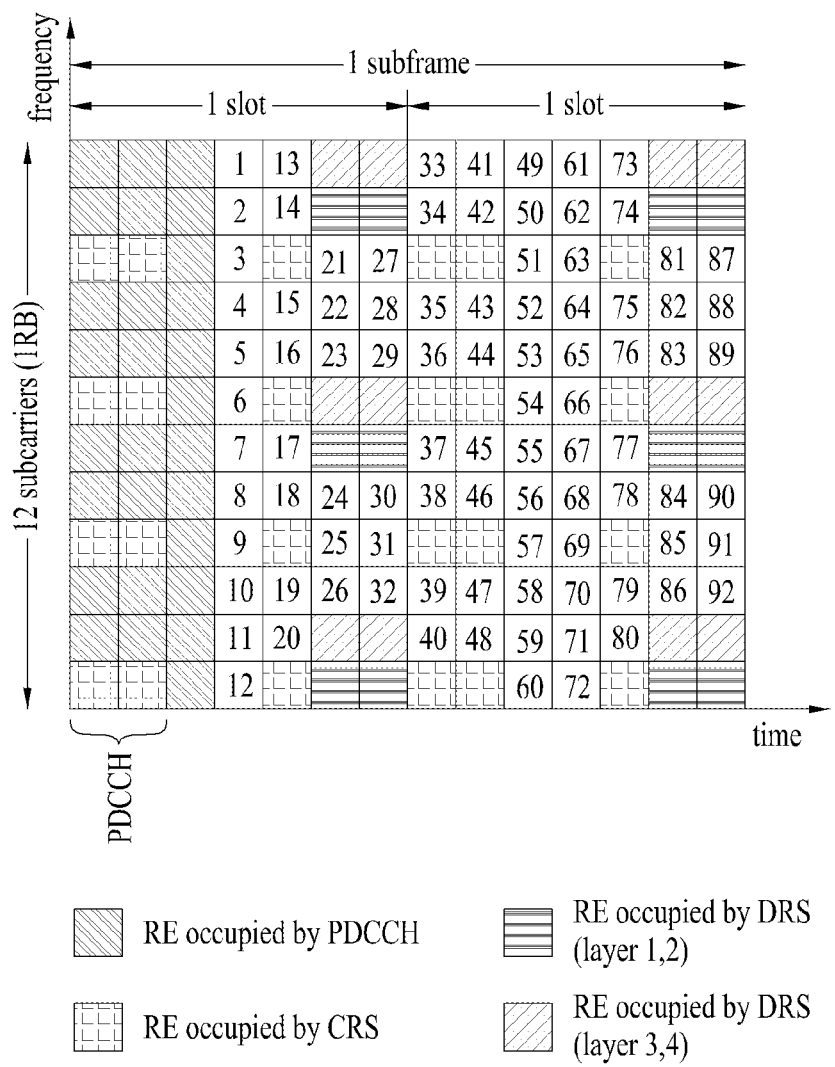
FIGS. 14 to 20 are conceptual diagrams illustrating a PDSCH mapping method according to an embodiment of the present invention.

FIG. 14 shows a PDSCH RE mapping at RB in a normal case. In FIG. 14, it is assumed that 4 CRS antenna ports and 4-layer DMRS are transmitted. This assumption is commonly applied to the following description. Referring to FIG. 14, PDSCH may be sequentially mapped according to numerals shown in REs (hereinafter referred to as available REs for PDSCH. Although the available REs for PDSCH may differ from the example shown in transmission of other signals such as PBCH, PSS/SSS, CSI-RS, etc.) other than some REs that correspond to a control region (indicated by PCFICH) including a PDCCH, the CRS position of Tx point, and the DMRS position. In FIG. 14, the CRS position may be decided by the cell ID. In more detail, the cell ID is modulo-operated as "6", and a position of a start frequency contained in RB may be decided. The start frequency position is called 'v-shift', and PDSCH RE mapping of two cells/two Tx points having different v-shift values is shown in FIG. 15.

Figure 15:
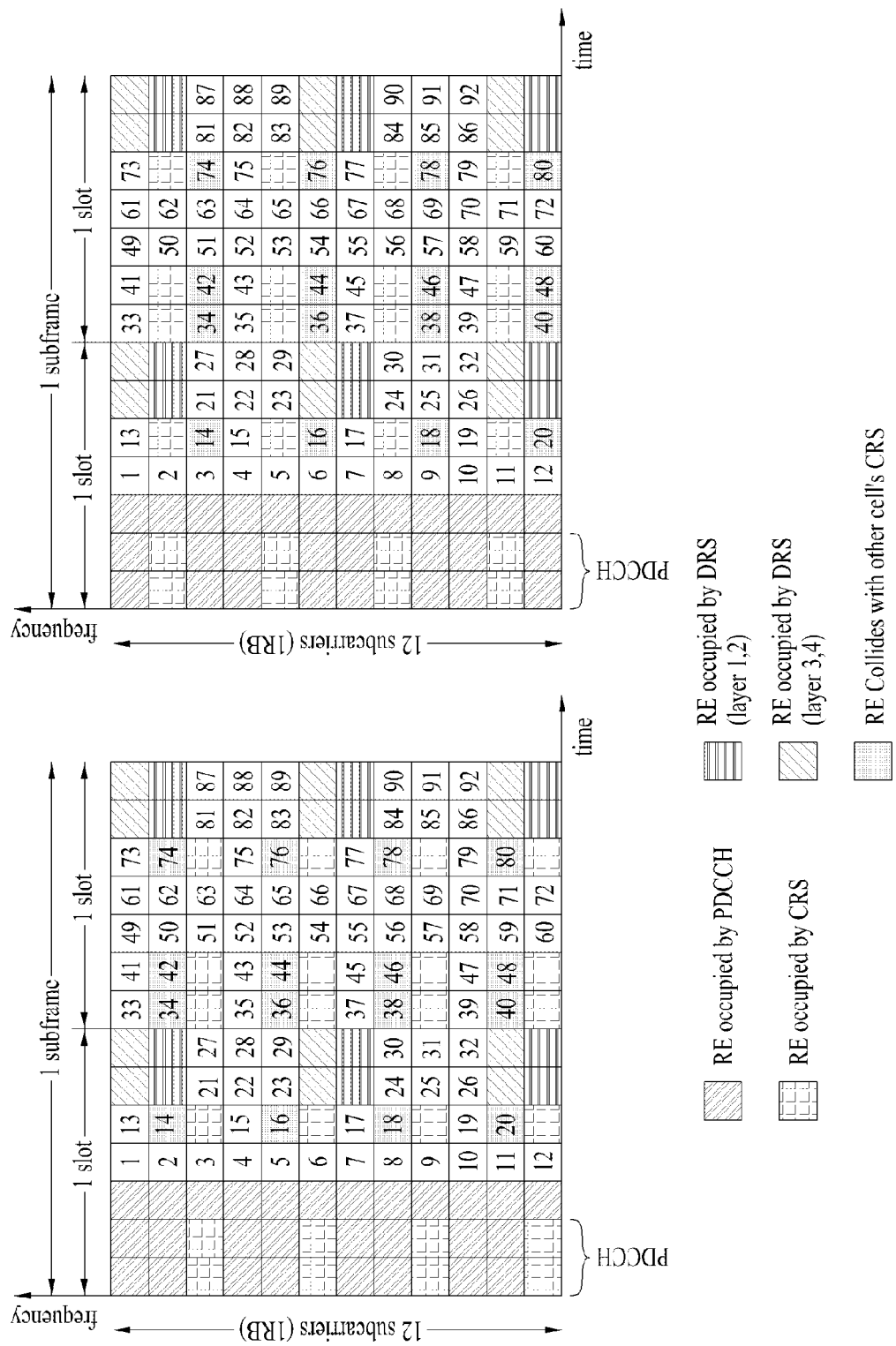

In FIG. 15, Cell A (First Tx point) and Cell B (Second Tx point) having different v-shift values are contained in the same CoMP cluster. Specifically, if joint transmission is performed, (considering a general UE (first-type UE) having no CRS IC capability) a cell (Cell B) participating in CoMP may not map a PDSCH to an RE (i.e., REs denoted by dots 14, 16, etc.) corresponding to the CRS transmission position. That is, PDSCH may be mapped to Cell A and Cell B that are configured to perform joint transmission, as shown in FIG. 16.

If the cell participating in CoMP maps a PDSCH to an RE corresponding to the CRS transmission position, the PDSCH may be incorrectly received due to interference caused by CRS of other cells at the corresponding position. However, if interference of the neighbor cell is measured using CRS, the CRS position is nullified, resulting in the occurrence of a measurement error. As a result, the cell (Cell B) participating in CoMP may transmit a dummy signal to the RE corresponding to the CRS transmission position.

Figure 16:
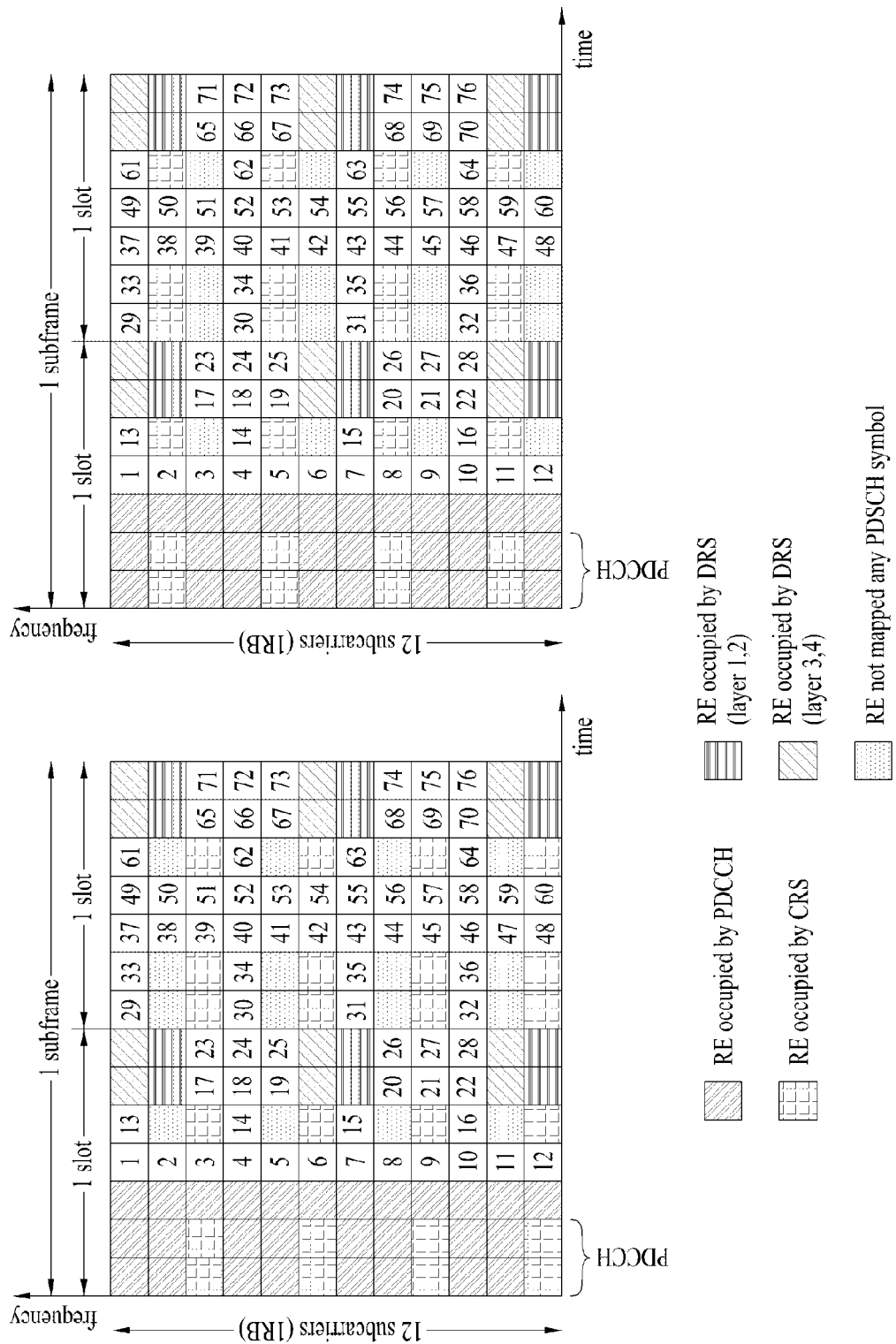
Figure 17:
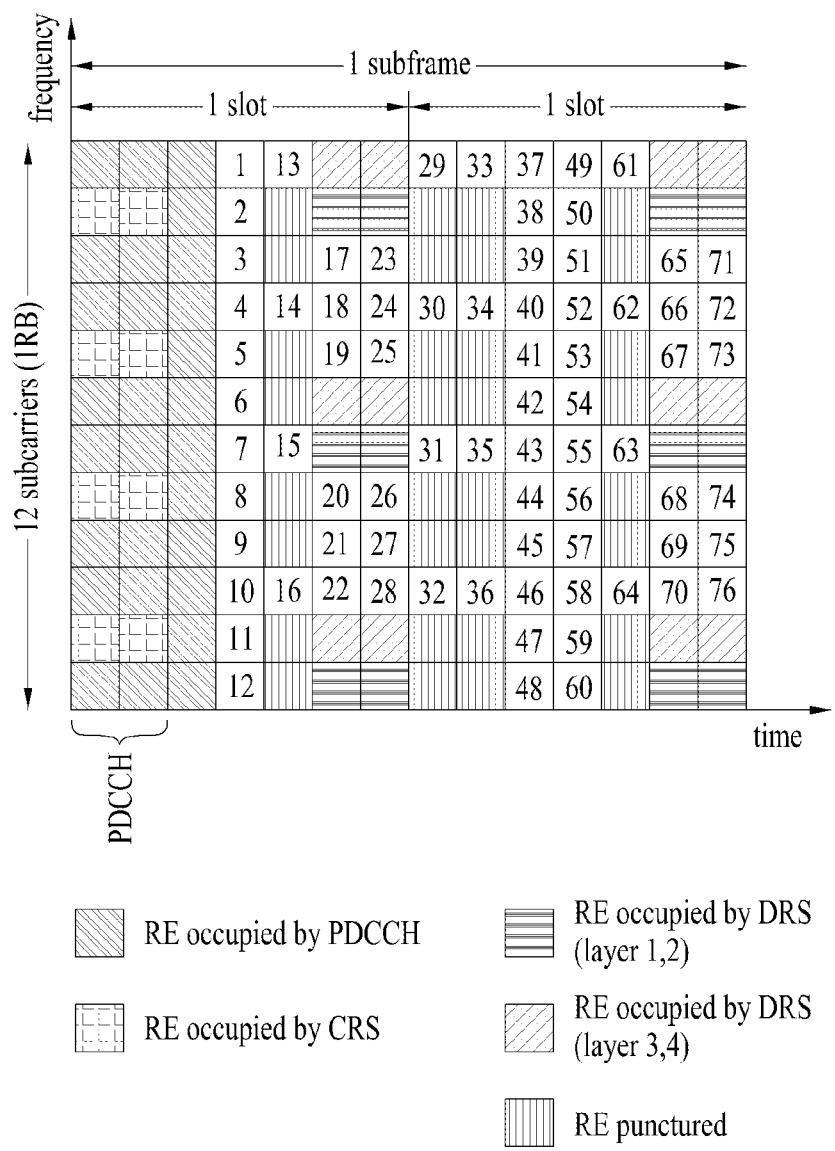

If PDSCH mapping is achieved as shown in FIG. 16, the UE may assume that PDSCH is mapped as shown in FIG. 17, and may then perform decoding.

However, as shown in the above description, if PDSCH is not mapped to the CRS position of another Tx point (second Tx point) performing joint transmission in CoMP, a waste of resources may occur in a UE (second-type UE) having CRS IC capabilities (receiver). The UE having the CRS IC receiver performs CRS cancellation of the second Tx point although a PDSCH is mapped to the CRS position of another Tx point, so that the UE can correctly receive a PDSCH.

Therefore, the first Tx point maps a PDSCH to REs of the first region other than some REs (REs denoted by dots of FIGS. 18 and 19) corresponding to the CRS of the second Tx point from among available REs of PDSCH. If the UE receiving the PDSCH is a second-type UE having the CRS IC capability/receiver, a PDSCH may be mapped to REs corresponding to the CRS of the second Tx point. That is, a PDSCH is mapped to a first region for the first-type UEs each having no CRS IC capability/receiver, and a PDSCH is mapped to a second region for the second-type UEs having the CRS IC capability/receiver, so that both of the Rx performance and the efficiency of resource usage can be improved.

Figure 18:
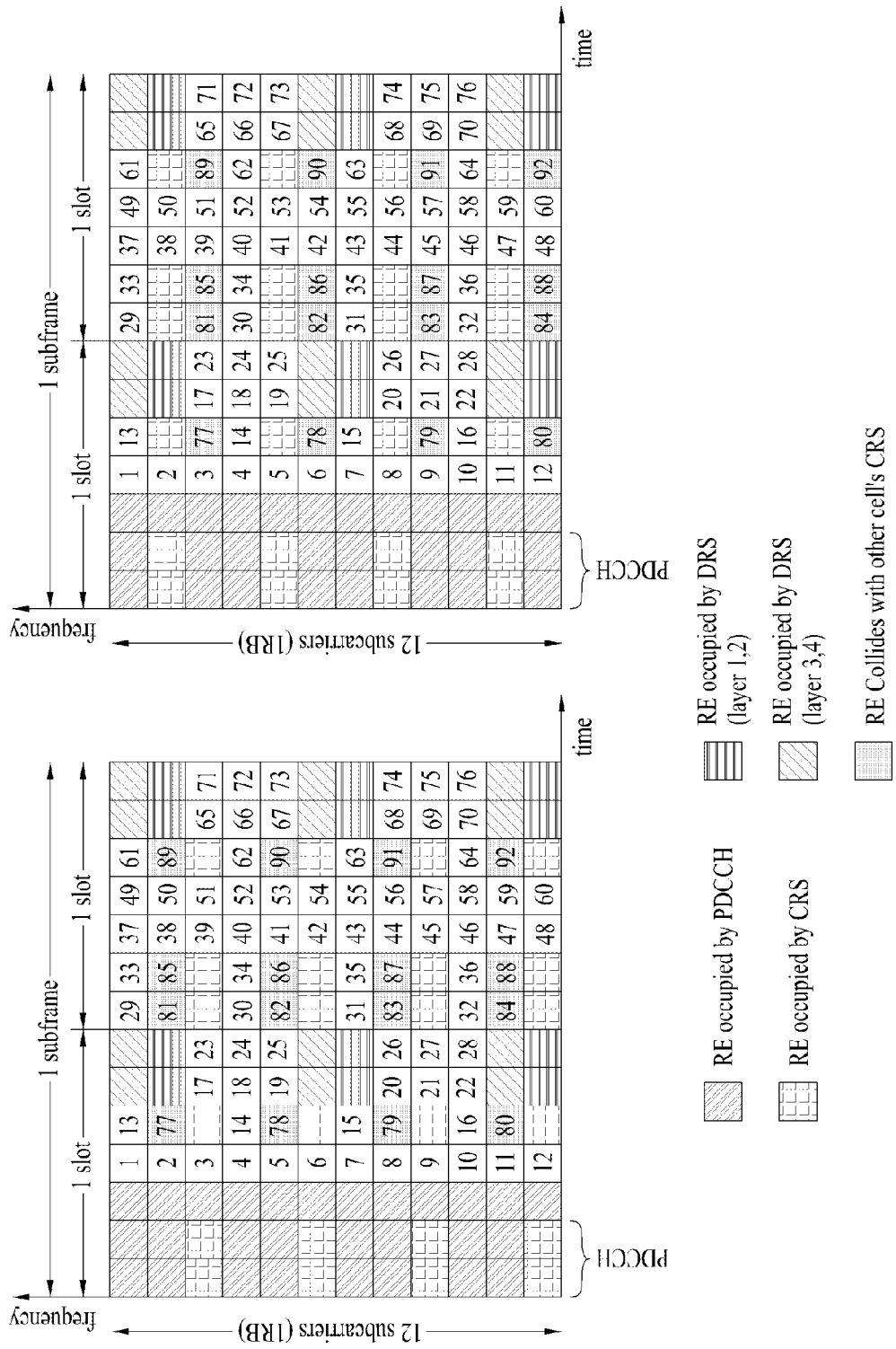
Figure 19:
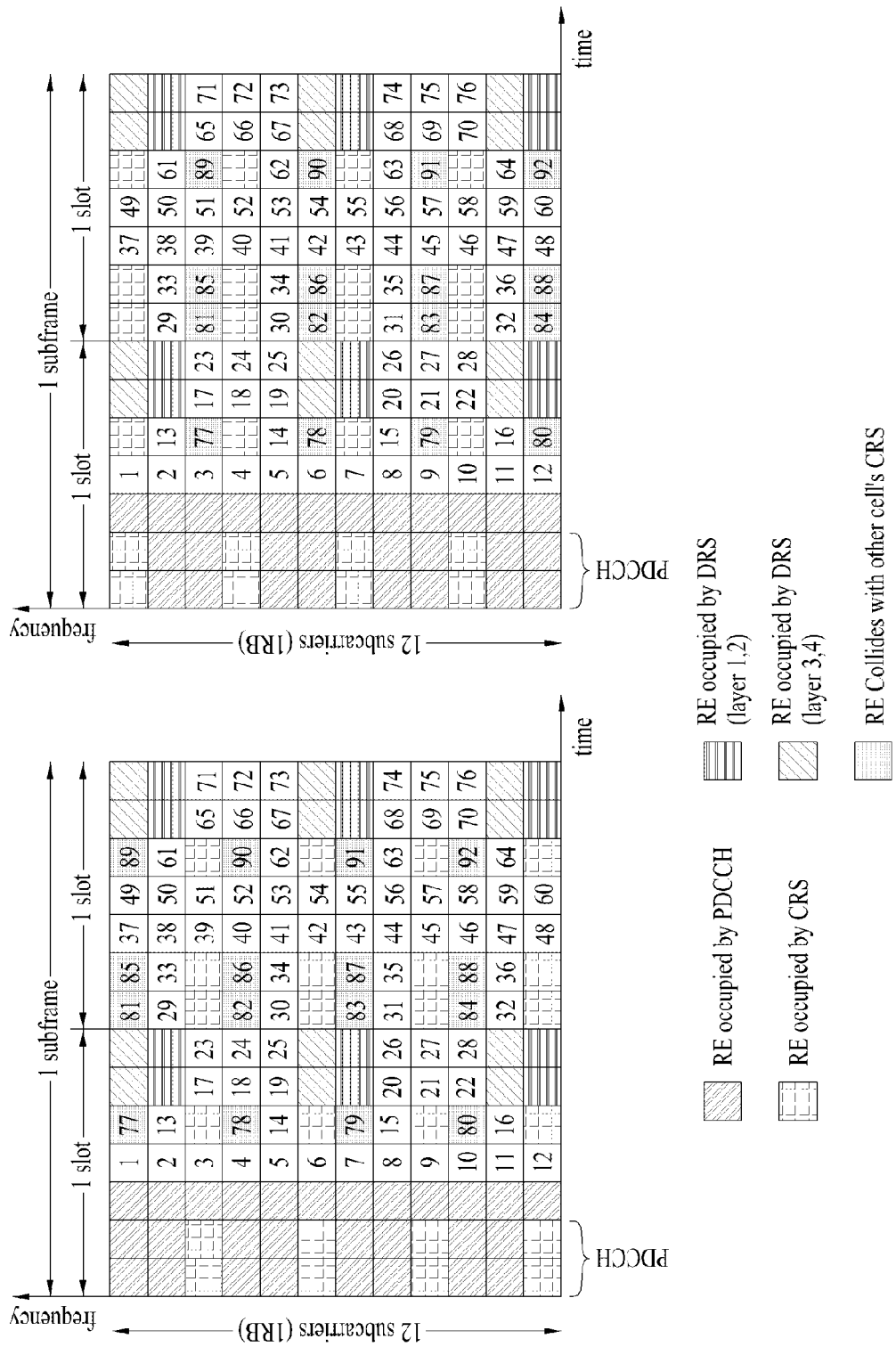

FIGS. 18 and 19 illustrate exemplary PDSCH mapping according to the above embodiment. A v-shift difference between Tx points performing joint transmission is set to 1 as shown in FIG. 18, and is also set to 2 as shown in FIG. 2.

For the PDSCH mapping scheme according to the embodiments, the transport block segmentation/code block construction needs to be changed. That is, a code block must be constructed in each of a part to be punctured and the other part not to be punctured according to the above-mentioned PDSCH mapping scheme. If code is segmented into two code blocks without consideration of the above operation, the first-type UE performs puncturing of only the second code block, so that an unexpected problem may occur in the PDSCH reception performance.

Therefore, for the first-type UE, according to a method for performing code block segmentation while simultaneously maintaining a constant code rate, some REs causing the CRS puncturing are excluded to construct the resultant code block, and additional code blocks may also be constructed in consideration of the number of REs causing the CRS puncturing.

For example, since the number of symbols (i.e., the number of REs) mapped to one RB is set to 76 in consideration of the first-type UE, the code block can be constructed in consideration of the 76 symbols. For some REs capable of being punctured (i.e., for 16 REs), the code block can be constructed. The same code rate can be maintained per segmented code block transmitted in one RB. In other words, assuming that the TB is segmented into a first code block and a second code block, the size of the first code block is determined in consideration of the number of REs of the first region, and the size of the second code block is determined in consideration of the number of REs of the second region.

Figure 20:
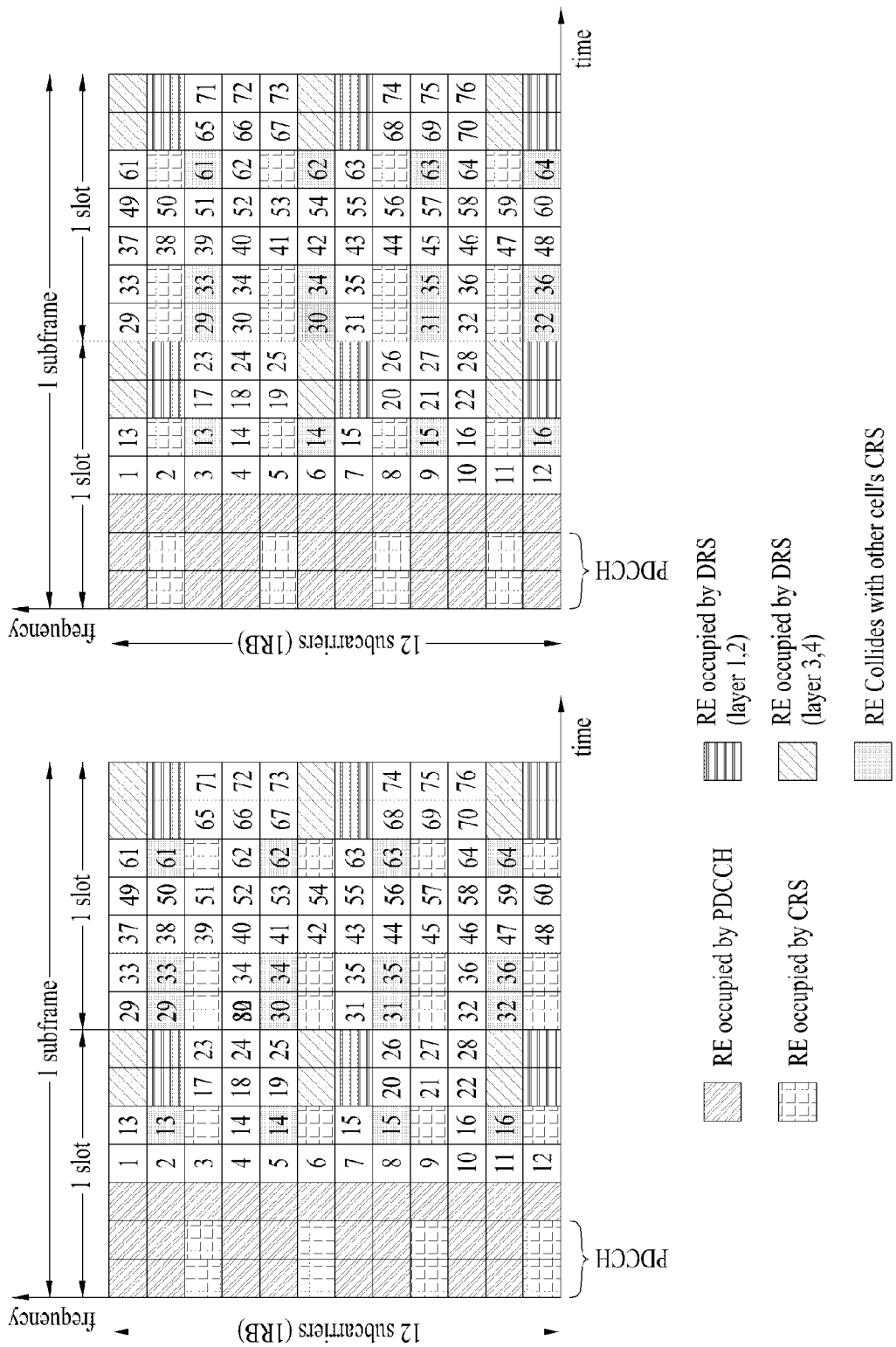

Meanwhile, the PDSCH mapping scheme in which the first-type UE is first considered and the second-type UE having the CRS IC capability/receiver is then considered will hereinafter be described in detail. In case of the first Tx point, a PDSCH is mapped to REs of the first region other than REs corresponding to the CRS of the second Tx point from among available REs for the PDSCH, and a PDSCH mapped to REs of the nearest first region is mapped to REs of a second region corresponding to CRS of the second Tx point. For example, as shown in FIG. 20, at the first Tx point (Cell A), symbols mapped to REs of the first region adjacent to REs (REs denoted by dots) corresponding to the CRS of the second Tx point (Cell B) may be repeatedly mapped. In this case, the embodiment can obtain additional energy gain caused by repeatedly used REs without affecting the code rate.

CRS Handling of UE Under CoMP Environment

Figure 21:
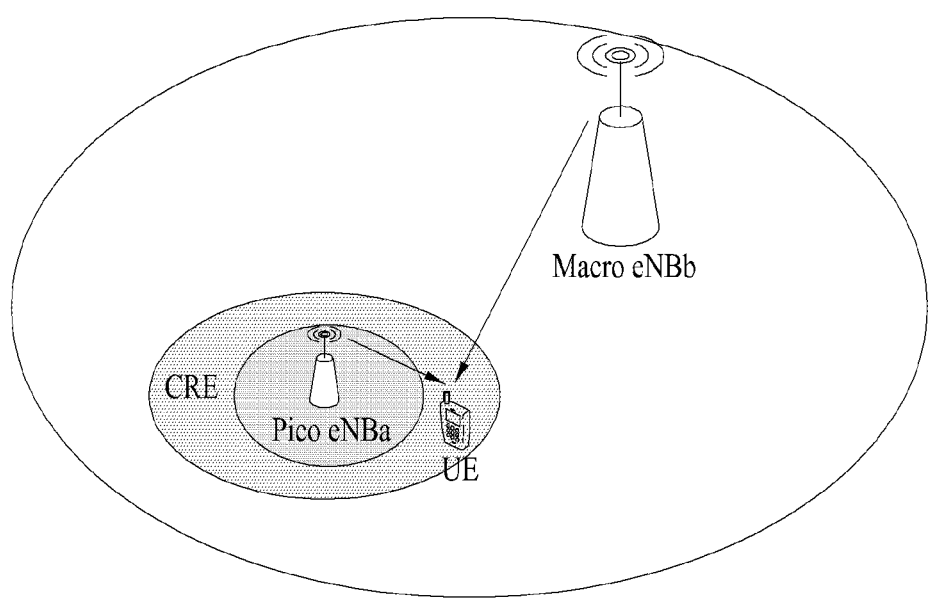
FIG. 21 is a conceptual diagram illustrating interference handling under a Coordinated Multi-Point (CoMP) environment according to an embodiment of the present invention.

A method for performing CRS cancellation using a UE that has the FeICIC capability under a CoMP environment so as to more efficiently receive a downlink signal will hereinafter be described in detail. The following description exemplarily shows the network environment shown in FIG. 21. That is, the UE is located in a CRE region of a pico eNBa, and the pico eNBa and a macro eNBb may perform cooperative transmission such as DPS, JT, etc. Under this situation, according to whether the serving cell is the pico eNBa or the macro eNBb, or according to the CoMP transmission scheme or the like, it may be determined whether the UE has to perform CRS cancellation, and a detailed description thereof will be given below.

In accordance with a first scenario, the UE has a pico eNB as a serving cell, and DPS is used as the CoMP transmission scheme. In this case, the neighbor cell CRS information (NeighborCellCRSInformation) transferred from the pico eNB acting as a serving cell to the UE may include information regarding the macro eNBb, and may also include CRS information of at least one neighbor cell. This CRS information of at least one neighbor cell causes an interference source to the pico eNBa acting as the serving cell.

In case of a subframe that receives a PDSCH from the pico eNBa acting as a serving cell, the UE need not perform cancellation of the CRS of the serving cell. When the pico eNBa acting as a serving cell maps a PDSCH to RE, the pico eNBa may perform mapping by skipping over the RE position at which CRS of the pico eNBa is transmitted. It may be necessary for the UE to cancel the CRS of the neighbor cell in so far as the subframe is not identical to a subframe that is muted for the pico eNBa by the macro eNBb acting as the neighbor cell.

In the case of a subframe in which the UE receives a PDSCH from the macro eNBb acting as the neighbor cell, it is necessary for the UE to cancel the CRS of the serving cell. In addition, the UE need not cancel the CRS of the neighbor cell, because the macro eNBb transmitting a PDSCH does not map the PDSCH to its own CRS transmission RE. Although CRS information of the macro eNBb is contained in the neighbor cell CRS information, the CRS IC operation need not be applied to the CRS of the macro eNBb. However, not only specific information indicating that the CRS position of the neighbor cell is rate-matched, but also the rate matching pattern information needs to be signaled in such a manner that the UE does not cancel the CRS of the neighbor cell. The operation for selecting the Tx point of the DPS is dynamically achieved, so that the rate matching pattern should be dynamically signaled. In addition, the indication message indicating such rate matching and the rate matching pattern should be transmitted through a control channel of downlink data, preferably, through the serving cell (pico eNBa). In addition, in association with PDSCH control information, PDSCH mapping may be changed according to the CRS frequency-axis shift (v-shift=Cell ID mod 6) of the macro eNBb, the number of CRS ports, and the MBSFN structure of the corresponding macro eNBb.

In accordance with a second scenario, the UE has the macro eNBb acting as a serving cell, and DPS is used as the CoMP transmission scheme. In this case, the neighbor cell CRS information transmitted from the macro eNBb acting as the serving cell to the UE may include CRS information of one or more neighbor cells, and the CRS information of the one or more neighbor cells may cause an interference source when the pico eNBb acting as the neighbor cell transmits a PDSCH to the UE.

In case of a subframe that receives a PDSCH from the macro eNBb acting as the serving cell, the PDSCH transmitted to the UE is rate-matched with the CRS RE of the macro eNBb, additional CRS cancellation need not be applied to the CRS of the serving cell or the rate matching pattern for indicating the additional CRS cancellation need not be signaled. In addition, CRS cancellation need not be applied to the CRS of the neighbor cell.

In the case of a subframe in which the UE receives a PDSCH from the pico eNBa acting as the neighbor cell, it is necessary for the UE to cancel the CRS of the serving cell because its own serving cell is used as the principal interference source when the UE receives a PDSCH from the pico eNBa. The UE does not cancel the CRS of the neighbor cell. The pico eNBa acting as the neighbor cell does not map a PDSCH to its own CRS position. However, in order to allow the UE not to perform cancellation of the CRS of the neighbor cell, not only an indication message indicating that the CRS position of the pico eNBa is rate-matched and transmitted, but also the rate matching pattern may be signaled to the UE.

In the above-mentioned description, the serving-cell CRS information needed for performing CRS cancellation of the serving-cell CRS need not be additionally signaled, because the serving-cell CRS information can be recognized on the basis of the cell ID obtained from the cell detection step, the number of antenna ports, and an MBSFN structure transmitted as a system information block (SIB).

The above-mentioned two cases (two scenarios) are shown in the following Table 8.

TABLE 8

| | | Indicate whether to cancel CRS of the serving cell | Indicate whether to cancel CRS of the neighbor cell |
|---|---|---|---|
| PDSCH transmission cell | Serving Cell | X | If the serving cell is a pico eNB, this case is denoted by O (but, in the case of muting, this case is denoted by X) If the serving cell is a macro eNB, this case is denoted by X. |
| | Neighbor Cell | O | X |

In accordance with a third scenario, the pico eNBa, the first macro eNBb, and the second macro eNBc (not shown in FIG. 21) may perform CoMP as necessary.

Assuming that the serving cell is the pico eNBa, the UE may perform CRS IC of neighbor-macro-eNBs CRSs received through higher layer signaling, wherein the neighbor macro eNBs may include the first macro eNBb and the second macro eNBc, so that signals related to the pico eNBa can be demodulated and CSI/RRM/RLM purposes can be achieved. However, if the UE performs CSI/RRM or the like of the first macro eNBb, CRS IC need not be applied to CRSs of the second macro eNB and the peripheral macro eNBs.

For measurement such as CSI/RRM/RLM, it may be necessary for the eNB to indicate or signal whether the UE has to perform CRS IC. When measurement of the pico eNB is performed, if the neighbor macro eNBs do not protect signal transmission of the pico eNB using an ABS or the like, and cancellation of CRSs of the peripheral macro eNBs for measurement of the pico eNBa may prevent the actual channel state from being reflected into such measurement. Therefore, only when restricted measurement for the pico eNBa is configured, CRS IC may be performed. In this case, a specific period in which the UE can perform CRS IC for measurement may be a period in which plural eNBs perform the ABS operation, i.e., may be a subframe set in which the actual pico eNB is protected. If restricted measurement is not configured for RRM/RLM measurement, the CRS IC operation may not be performed.

Although restricted measurement is configured, the UE may not always perform CRS IC for CSI/RRM/RLM measurement of all eNBs. For example, the operation for performing CRS cancellation of the second macro eNBc for CSI/RRM/RLM measurement of the first macro eNBb may be undesirable. As a result, ABS of the first macro eNBb and the second macro eNBc can protect signals of the pico eNB, instead of protecting signals of other macro eNBs. Therefore, although restricted measurement is configured, information as to whether CRS IC is performed is changed according to which eNB is used for CSI/RRM/RLM measurement at a specific measurement subframe subset, so that there is a need for the eNB to indicate the changed result. In other words, the eNB may signal specific information indicating whether CRS IC of a specific Tx point/eNB needs to be performed for CSI/RRM/RLM measurement.

QCL (Quasi Co-Location/Located)

The embodiments related to QCL (Quasi Co-Location/located) in the above-mentioned 'PDSCH RE mapping and Quasi co-location indicator' field will hereinafter be described in detail. The 'PDSCH RE mapping and Quasi co-location indicator' field is contained in DCI format 2D, and 2-bit information contained in each state of the corresponding field is shown in the following Table 9.

TABLE 9

| Value of 'PDSCH RE Mapping and Quasi-Co-Location Indicator' field | Description |
| --- | --- |
| '00' | Parameter set 1 configured by higher layers |
| '01' | Parameter set 2 configured by higher layers |
| '10' | Parameter set 3 configured by higher layers |
| '11' | Parameter set 4 configured by higher layers |

In Table 9, the parameter sets may be transmitted to the UE through higher layer signaling, and may have the following information shown in Table 10.

TABLE 10

'Number of CRS antenna ports for PDSCH RE mapping'.
'CRS frequency shift for PDSCH RE mapping'.
'MBSFN subframe configuration for PDSCH RE mapping'.
'Zero-power CSI-RS resource configuration for PDSCH RE mapping'.
'PDSCH starting position for PDSCH RE mapping'.
'CSI-RS resource configuration identity for QC assumption.

In Table 10, 'Number of CRS antenna ports for PDSCH RE mapping', 'CRS frequency shift for PDSCH RE mapping', 'MBSFN subframe configuration for PDSCH RE mapping', 'Zero-power CSI-RS resource configuration for PDSCH RE mapping', and 'PDSCH starting position for PDSCH RE mapping' may indicate PDSCH RE mapping. 'CSI-RS resource configuration identity for QC assumption' may include CRS information that can be QC-assumed by the UE, so that the 'CSI-RS resource configuration identity for QC assumption' information may indicate whether the UE can use 'large-scale property' information related to CRS of a certain cell.

In more detail, the information shown in Table 10 may be signaled, as 'PDSCH-RE-MappingQCL-Config IE' shown in Table 11, to the UE.

TABLE 10

| PDSCH-RE-MappingQCL-Config-r11 ::= | SEQUENCE { |
| --- | --- |
| pdsch-RE-MappingQCL-ConfigId-r11, | PDSCH-RE-MappingQCL-ConfigId-r11, |
| optionalSetOfFields-r11 | SEQUENCE { |
| crs-PortsCount-r11 | ENUMERATED {n1, n2, n4, spare1}, |
| crs-FreqShift-r11 | INTEGER (0..5), |
| mbsfn-SubframeConfig-r11 | MBSFN-SubframeConfig |
| OPTIONAL, -- Need OR | |
| pdsch-Start-r11 | ENUMERATED {reserved, n1, n2, n3, n4, assigned} |
| } | |
| | OPTIONAL, -- Need OP |
| csi-RS-IdentityZP-r11 | CSI-RS-IdentityZP-r11, |
| qcl-CSI-RS-IdentityNZP-r11 | CSI-RS-IdentityNZP-r11 |
| OPTIONAL, -- Need OR | |
| ... | |
| } | |

In Table 10, 'qcl-CSI-RS-IdentityNZP-r11' may correspond to 'CSI-RS-ConfigNZP-r11' shown in Table 11, and may have QCL CRS information (qcl-CRS-Info-r11) that can be QC-assumed. QCL CRS information may include the cell ID related information (qcl-ScramblingIdentity), the number of CRS ports (crs-PortsCount), and MBSFN subframe configuration information (mbsfn-SubframeConfig).

TABLE 11

| CSI-RS-ConfigNZP-r11 ::= | SEQUENCE { |
| --- | --- |
| csi-RS-IdentityNZP-r11 | CSI-RS-IdentityNZP-r11, |
| antennaPortsCount-r11 | ENUMERATED {an1, an2, an4, an8}, |
| resourceConfig-r11 | INTEGER (0..31), |
| subframeConfig-r11 | INTEGER (0..154), |
| scramblingIdentity-r11 | INTEGER (0..503), |
| qcl-CRS-Info-r11 | SEQUENCE { |
| qcl-ScramblingIdentity-r11 | INTEGER (0..503), |
| crs-PortsCount-r11 | ENUMERATED (n1, n2, n4, spare1}, |
| mbsfn-SubframeConfig-r11 | MBSFN-SubframeConfig |
| OPTIONAL, -- Need OR | |
| } | |
| ... | OPTIONAL, -- Need OR |
| } | |

The UE may recognize CSI-RS configuration information shown in Table 11, and may recognize an RE, subframe, and transmission period through which CRS-RS is transmitted on the basis of the recognized result, so that the UE can receive CSI-RS. In addition, through QCL CRS information of the CSI-RS configuration information, the UE may recognize whether to receive CSI-RS using QC assumption related to CRS of a certain cell. In this case, the QCL CRS information may include the number of CRS ports (crs-PortsCount) and MBSFN subframe configuration information (mbsfn-SubframeConfig). This information may be different from other information known to the UE. For example, if the cell ID related information (qcl-ScramblingIdentity) contained in QCL CRS information is identical to that of the serving cell of the UE, the UE can recognize CRS port information obtained through serving cell search and MBSFN configuration information obtained through SIB 2. If the above-mentioned information known to the UE is different from information regarding the number of CRS ports (crs-PortsCount) and the subframe configuration information (mbsfn-SubframeConfig), the UE operation may cause unexpected problems. In this case, information known to the UE may have priority, and as such a detailed description thereof will be given below.

First, the number of CRS ports (crs-PortsCount) that is recognized by the UE on the basis of QCL CRS information may be different from a number of CRS ports known to the UE. In more detail, if information (crs-PortsCount) regarding the number of CRS ports recognized on the basis of QCL CRS information is higher than the number of CRS ports known to the UE, QCL assumption may be applied only to the number of CRS ports known to the UE. If the number of CRS ports is less than the number of CRS ports known to the UE, QCL assumption may be applied to the CRS port corresponding to information regarding the number of CRS ports.

Second, in association with the MBSFN subframe configuration information (mbsfn-SubframeConfig), if the MBSFN subframe configuration information of QCL CRS information is different from the MBSFN subframe configuration received through SIB, information may be first received through SIB. In more detail, if the subframe receiving the CSI-RS is based on the MBSFN subframe configuration information of QCL CRS information, all CRSs for use in a normal subframe may be used for QCL assumption. In addition, if a subframe receiving the CSI-RS is based on the MBSFN subframe configuration information for use in QCL CRS information, this frame is determined to be a normal subframe. If a subframe receiving the CSI-RS is based on information known to the UE, this subframe is determined to be an MBSFN subframe, CRS reaching the second OFDM symbol within the subframe, i.e., CRS of a control region (PDSCH region) may be used for QCL assumption.

If the subframe receiving CSI_RS is contained in a BCCH modification period (MP), i.e., if system information needs to be updated, MBSFN subframe configuration information (mbsfn-SubframeConfig) of QCL CRS information may have priority. In this case, RRC reconfiguration should be properly carried out in such a manner that CSI-RS configuration information can be updated according to a specific time at which system information will be changed. In order to more correctly adjust the time at which system information will be changed, when "UE-dedicated RRC signaling of CSI-RS configuration" is downloaded, timing information (e.g., QCLed CRS information including CRS scrambling ID, number of CRS ports, and/or MBSFN subframe configuration) for applying the corresponding information to a certain time point may also be downloaded. For example, $n_s$ unit indicating a slot number, a subframe unit, an SFN and radio frame number, and specific time information at which the correct absolute time can be recognized between the eNB and the UE may also be contained in the downloaded information.

If 'CSI-RS-ConfigNZP-r11' is shown in the following table 12, i.e., if a physical cell ID of the serving cell and 'qcl-ScramblingIdentity' have the same values so that the CRS port number information (crs-PortsCount) and the MBSFN subframe configuration information are omitted, the CRS port number and/or the MBSFN configuration may be predefined according to the serving cell information. The above-mentioned content may be applied only when the UE is set to QCL type B.

TABLE 12

```
CSI-RS-ConfigNZP-r11 ::=           SEQUENCE {
    csi-RS-IdentityNZP-r11             CSI-RS-IdentityNZP-r11,
    antennaPortsCount-r11              ENUMERATED {an1, an2, an4, an8},
    resourceConfig-r11                 INTEGER (0..31),
    subframeConflg-r11                 INTEGER (0..154),
    scramblingIdentity-r11             INTEGER (0..503),
    qcl-CRS-Info-r11                   SEQUENCE {
      qcl-ScramblingIdentity-r11         INTEGER (0..503},
        OPTIONAL,   -- Need OR
    }
                                       OPTIONAL,   -- Need OR
    ...
}
```

In the above-mentioned description, 'qcl-ScramblingIdentity' is not always applied only to the case in which 'qcl-ScramblingIdentity' is identical to the serving cell PCID. For example, information regarding the number of serving cell CRS ports and the MBSFN information known as SIB2 are always set to default information. This default information may be applied to information that is contained in RRC signaling from among the above-mentioned information and is not transferred. That is, although 'qcl-ScramblingIdentity' from among QCL CRS information contained in CSI-RS configuration is different from the serving cell PCID, if the CRS port number information (crs-PortsCount) and MBSFN subframe configuration information (mbsfn-SubframeConfig) are wholly or partially omitted, the omitted information may always be used as the above default information.

The neighbor cell CRS information may be applied to the UE for CRS handling. In addition, for QC assumption of the UE, information (cell ID, number of CRS ports, MBSFN subframe configuration) of the cell that can be QC-assumed by the UE is signaled. In addition, similar information is transferred for PDSCH RE mapping. Plural containers used for transmission of each type of information are different from each other. The neighbor cell CRS information transferred for CRS interference handling is transferred to NeighborCellCRSInformation IE, and CRS information transferred for QC assumption is transmitted from qcl-CRS-Info IE contained in CSI-RS-ConfigNZP. Assuming that CRS information of a specific cell, specifically, 'MBSFN subframe configuration' information, is first updated in one IE from among three IEs, and transferred to the UE, the UE has to use the latest update value when using the CRS information of the corresponding cell.

For example, assuming that CRS information of the cell A is transmitted to 'NeighborCellCRSInformation IE' and CRS information of the cell A is also transmitted to 'qcl-CRS-Info IE', the UE first receives 'NeighborCellCRSInformation IE' and performs interference handling of the CRS of the cell A. In this case, if the corresponding UE is changed to TM mode 10, or if the COMP measurement set is changed, QC assumption for the cell A needs to be used. In addition, assuming that the UE receives 'qcl-CRS-Info' and if CRS information of the cell A is contained in the corresponding UE, if CRS information of the cell A contained in one IE is different from that of the cell A contained in the other IE, the UE trusts CRS information of the latest reception Cell A. Although additional signaling does not exist, CRS information of the cell A contained in the legacy reception 'NeighborCellCRSInformation IE' is updated to the latest reception value, and the CRS IC operation from the cell A is carried out. Likewise, although the UE has already received respective IEs, the latest reception value or the latest update value is trusted.

Figure 22:
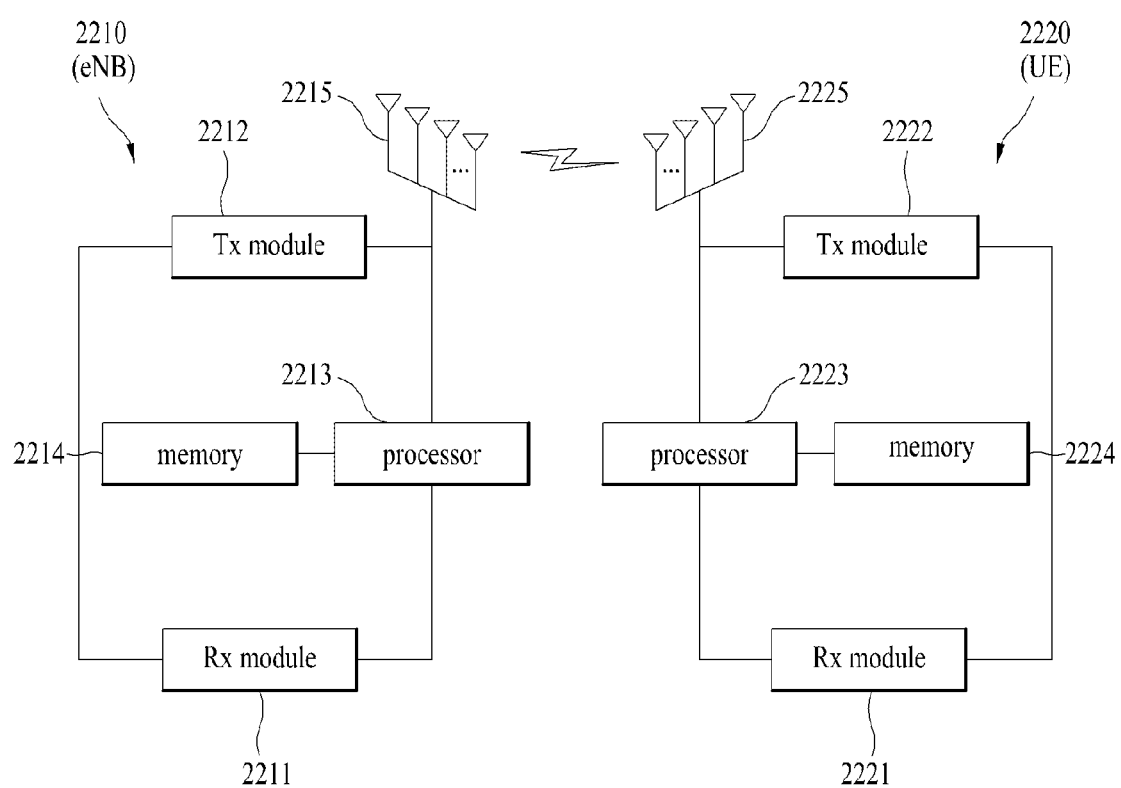
FIG. 22 is a block diagram illustrating a transceiver apparatus according to embodiments of the present invention.

FIG. 22 is a block diagram illustrating a transmission point apparatus and a UE apparatus according to embodiments of the present invention.

Referring to FIG. 22, the transmission point apparatus 2210 according to the present invention may include a reception (Rx) module 2211, a transmission (Tx) module 2212, a processor 2213, a memory 2214, and a plurality of antennas 2215. The plurality of antennas 2215 indicates a transmission point apparatus for supporting MIMO transmission and reception. The reception (Rx) module 2211 may receive a variety of signals, data and information on an uplink starting from the UE. The Tx module 2212 may transmit a variety of signals, data and information on a downlink for the UE. The processor 2213 may provide overall control to the transmission point apparatus 2210.

The processor 2213 of the transmission point apparatus 2210 according to one embodiment of the present invention can process the above-mentioned embodiments.

The processor 2213 of the transmission point apparatus 2210 processes information received at the transmission point apparatus 2210 and transmission information to be transmitted externally. The memory 2214 may store the processed information for a predetermined time. The memory 2214 may be replaced with a component such as a buffer (not shown).

Referring to FIG. 22, the UE apparatus 2220 may include an Rx module 2221, a Tx module 2222, a processor 2223, a memory 2224, and a plurality of antennas 2225. The plurality of antennas 2225 indicates a UE apparatus supporting MIMO transmission and reception. The Rx module 2221 may receive downlink signals, data and information from the BS (eNB). The Tx module 2222 may transmit uplink signals, data and information to the BS (eNB). The processor 2223 may provide overall control to the UE apparatus 2220.

The processor 2223 of the UE apparatus 2220 according to one embodiment of the present invention can process the above-mentioned embodiments.

The processor 2223 of the UE apparatus 2220 processes information received at the UE apparatus 2220 and transmission information to be transmitted externally. The memory 2224 may store the processed information for a predetermined time. The memory 2224 may be replaced with a component such as a buffer (not shown).

The specific configurations of the transmission point apparatus and the UE apparatus may be implemented such that the various embodiments of the present invention are performed independently or two or more embodiments of the present invention are performed simultaneously. Redundant matters will not be described herein for clarity.

The description of the transmission point apparatus 2210 shown in FIG. 22 may be applied to the eNB (BS), or may also be applied to a relay node (RN) acting as a DL transmission entity or UL reception entity without departing from the scope or spirit of the present invention. In addition, the description of the UE apparatus 2220 may be applied to the UE, or may also be applied to a relay node (RN) acting as a UL transmission entity or DL reception entity without departing from the scope or spirit of the present invention.

The above-described embodiments of the present invention can be implemented by a variety of means, for example, hardware, firmware, software, or a combination thereof.

In the case of implementing the present invention by hardware, the present invention can be implemented with application specific integrated circuits (ASICs), Digital signal processors (DSPs), digital signal processing devices (DSPDs), programmable logic devices (PLDs), field programmable gate arrays (FPGAs), a processor, a controller, a microcontroller, a microprocessor, etc.

If operations or functions of the present invention are implemented by firmware or software, the present invention can be implemented in the form of a variety of formats, for example, modules, procedures, functions, etc. Software code may be stored in a memory to be driven by a processor. The memory may be located inside or outside of the processor, so that it can communicate with the aforementioned processor via a variety of well-known parts.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. For example, those skilled in the art may use each construction described in the above embodiments in combination with each other. Accordingly, the invention should not be limited to the specific embodiments described herein, but should be accorded the broadest scope consistent with the principles and novel features disclosed herein.

Those skilled in the art will appreciate that the present invention may be carried out in other specific ways than those set forth herein without departing from the spirit and essential characteristics of the present invention. The above exemplary embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Also, it will be obvious to those skilled in the art that claims that are not explicitly cited in the appended claims may be presented in combination as an exemplary embodiment of the present invention or included as a new claim by subsequent amendment after the application is filed.

INDUSTRIAL APPLICABILITY

The embodiments of the present invention can be applied to a variety of mobile communication systems.

The invention claimed is:

1. A method for receiving a downlink signal by a user equipment (UE) in a wireless communication system, the method comprising:
   receiving neighbor cell—Cell specific Reference Signal (CRS) information, indication information for indicating that a CRS position of the neighbor is rate-matched, and rate matching pattern information from a serving cell;
   receiving a physical downlink shared channel (PDSCH) from any one of the serving cell and a neighbor cell;
   determining whether to cancel a CRS of the neighbor cell based on the indication information and the rate matching pattern information; and
   if the CRS of the neighbor cell is not rate matched, canceling the CRS of the neighbor cell.

2. The method according to claim 1, further comprising:
   if the UE receives the PDSCH from the neighbor cell, canceling a CRS of the serving cell only when the CRS of the serving cell is not rate matched.

3. The method according to claim 1, wherein:
   if the UE receives the PDSCH from the serving cell, a CRS of the serving cell is not canceled.

4. The method according to claim 1, wherein:
   if the serving cell is a pico base station (BS) and the neighbor cell is a macro BS, the neighbor cell—CRS information indicates at least one neighbor cell that causes interference to the serving cell.

5. The method according to claim 1, wherein:
   if the serving cell is a macro base station (BS) and the neighbor cell is a pico BS, the neighbor cell—CRS information indicates at least one neighbor cell that causes interference when the neighbor cell transmits a signal to the UE.

6. The method according to claim 1, wherein the neighbor cell—CRS information includes a plurality of cell identifiers (IDs), each of which is mapped to information regarding a number of antenna ports, information regarding a frequency region to which CRS is transmitted, and information regarding a time region to which CRS is transmitted.

7. The method according to claim 6, wherein the UE cancels CRS of cells corresponding to specific cell IDs of the plurality of cell IDs that do not have a confirmed rate matching.

8. The method according to claim 7, wherein a rate-matched cell ID is confirmed based on information corresponding to a predetermined field value of a downlink control information (DCI) format.

9. The method according to claim 1, wherein the serving cell and the neighbor cell are configured to perform cooperative transmission for the UE.

10. A user equipment (UE) device for use in a wireless communication system, the UE device comprising:
    a reception (Rx) module; and
    a processor,
    wherein the processor is configured to:
       receive, via the Rx module, neighbor cell—Cell specific Reference Signal (CRS) information, indication information for indicating that a CRS position of the neighbor is rate-matched, and rate matching pattern information from a serving cell,
       receive, via the Rx module, a physical downlink shared channel (PDSCH) from any one of a serving cell and a neighbor cell,
       determine whether to cancel a CRS of the neighbor cell based on the indication information and the rate matching pattern information, and
       if the CRS of the neighbor cell is not rate matched, cancel the CRS of the neighbor cell.

11. The UE device according to claim 10, wherein if the processor receives the PDSCH from the neighbor cell, the processor cancels a CRS of the serving cell only when the CRS of the serving cell is not rate matched.

12. The UE device according to claim 10, wherein:
    if the processor receives the PDSCH from the serving cell, a CRS of the serving cell is not canceled.

13. The UE device according to claim 10, wherein:
    if the serving cell is a pico base station (BS) and the neighbor cell is a macro BS, the neighbor cell—CRS information indicates at least one neighbor cell that causes interference to the serving cell.

14. The UE device according to claim 10, wherein:
    if the serving cell is a macro base station (BS) and the neighbor cell is a pico BS, the neighbor cell—CRS information indicates at least one neighbor cell that causes interference when the neighbor cell transmits a signal to the UE.

15. The UE device according to claim 10, wherein the neighbor cell—CRS information includes a plurality of cell identifiers (IDs), each of which is mapped to information regarding a number of antenna ports, information regarding a frequency region to which CRS is transmitted, and information regarding a time region to which CRS is transmitted.

16. The UE device according to claim 15, wherein the processor cancels CRS of cells corresponding to specific cell IDs of the plurality of cell IDs that do not have a confirmed rate matching.

17. The UE device according to claim 16, wherein a rate-matched cell ID is confirmed based on information corresponding to a predetermined field value of a downlink control information (DCI) format.

18. The UE device according to claim 10, wherein the serving cell and the neighbor cell are configured to perform cooperative transmission for the UE.

* * * * *